United States Patent
Goel et al.

(10) Patent No.: US 10,304,197 B2
(45) Date of Patent: May 28, 2019

(54) AUTOMATED CENTERLINE EXTRACTION METHOD AND GENERATION OF CORRESPONDING ANALYTICAL EXPRESSION AND USE THEREOF

(71) Applicant: The Cleveland Clinic Foundation, Cleveland, OH (US)

(72) Inventors: Vikash R. Goel, Cleveland, OH (US); Donald P. Greenberg, Ithaca, NY (US); Roy K. Greenberg, Bratenahl, OH (US)

(73) Assignee: THE CLEVELAND CLINIC FOUNDATION, Cleveland, OH (US)

( * ) Notice: Subject to any disclaimer, the term of this patent is extended or adjusted under 35 U.S.C. 154(b) by 0 days.

(21) Appl. No.: 15/883,626

(22) Filed: Jan. 30, 2018

(65) Prior Publication Data

US 2018/0174303 A1 Jun. 21, 2018

Related U.S. Application Data

(63) Continuation of application No. 14/727,157, filed on Jun. 1, 2015, now Pat. No. 9,922,424, which is a
(Continued)

(51) Int. Cl.
*G06K 9/00* (2006.01)
*G06T 7/13* (2017.01)
(Continued)

(52) U.S. Cl.
CPC ............. *G06T 7/13* (2017.01); *G06T 7/155* (2017.01); *G06T 7/37* (2017.01); *G06T 7/60* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,501,848 B1 * | 12/2002 | Carroll | G06T 11/006 |
| | | | 382/128 |
| 6,728,566 B1 * | 4/2004 | Subramanyan | G06T 11/005 |
| | | | 600/407 |

(Continued)

FOREIGN PATENT DOCUMENTS

| | | |
|---|---|---|
| EP | 0954830 B1 | 3/2006 |
| WO | 02/029717 A3 | 4/2002 |

(Continued)

OTHER PUBLICATIONS

Park, Hyungjun, and Kwangsoo Kim. "Smooth surface approximation to serial cross-sections." Computer-Aided Design 28.12 (1996): 995-1005.

(Continued)

*Primary Examiner* — Alex Kok S Liew
(74) *Attorney, Agent, or Firm* — Tarolli, Sundheim, Covell & Tummino LLP

(57) ABSTRACT

A computer implemented method for determining a centerline of a three-dimensional tubular structure is described. The method includes providing an edge-detected data set of voxels that characterize a boundary of the tubular structure according to a three-dimensional voxel data set for the tubular structure. A gradient field of a distance transformation is computed for the edge-detected dataset. A voxel data set corresponding to a centerline of the tubular structure is computed according to derivative of gradient field.

16 Claims, 20 Drawing Sheets

Related U.S. Application Data continuation of application No. 12/673,089, filed as application No. PCT/US2008/065198 on May 30, 2008, now Pat. No. 9,047,685.

(60) Provisional application No. 61/029,934, filed on Feb. 20, 2008, provisional application No. 60/932,213, filed on May 30, 2007.

(51) Int. Cl.
  *G06T 7/60* (2017.01)
  *G06T 17/30* (2006.01)
  *G06T 7/37* (2017.01)
  *G06T 7/155* (2017.01)

(52) U.S. Cl.
  CPC .... *G06T 17/30* (2013.01); *G06T 2207/10072* (2013.01); *G06T 2207/20041* (2013.01); *G06T 2207/20044* (2013.01); *G06T 2207/20048* (2013.01); *G06T 2207/30021* (2013.01); *G06T 2207/30028* (2013.01); *G06T 2207/30101* (2013.01); *G06T 2207/30172* (2013.01); *G06T 2210/41* (2013.01); *G06T 2211/404* (2013.01)

(56) References Cited

U.S. PATENT DOCUMENTS

| | | | |
|---|---|---|---|
| 6,782,284 | B1 | 8/2004 | Subramanyan et al. |
| 7,149,333 | B2 | 12/2006 | Pieper et al. |
| 2003/0056799 | A1* | 3/2003 | Young ............... G06T 7/12 600/425 |
| 2005/0152588 | A1* | 7/2005 | Yoshida ............ G06T 7/0012 382/128 |
| 2006/0036167 | A1 | 2/2006 | Shina |
| 2006/0251300 | A1* | 11/2006 | Borgert ............... A61B 5/06 382/128 |
| 2006/0280351 | A1 | 12/2006 | Luping et al. |
| 2007/0116342 | A1* | 5/2007 | Zarkh ............... G06T 7/564 382/130 |
| 2007/0248250 | A1* | 10/2007 | Gulsun .............. G06K 9/342 382/128 |
| 2008/0018646 | A1* | 1/2008 | Farag ............... G06T 7/64 345/424 |
| 2008/0132774 | A1* | 6/2008 | Milstein ............. G06T 7/12 600/407 |
| 2009/0279758 | A1* | 11/2009 | Dikici ............... G06T 7/11 382/128 |

FOREIGN PATENT DOCUMENTS

| | | |
|---|---|---|
| WO | 2003/045244 A2 | 6/2003 |
| WO | 2005/055496 A2 | 6/2005 |
| WO | 2007/005976 A1 | 1/2007 |
| WO | 2007/1033379 A2 | 3/2007 |

OTHER PUBLICATIONS

Goel, Vikash Ravi, Roy K. Greenberg, and Donald P. Greenberg. "Automated vascular geometric analysis of aortic aneurysms." IEEE computer graphics and applications 28.3 (2008).

Goel, Vikash Ravi, Roy K. Greenberg, and Donald P. Greenberg. "Mathematical analysis of DICOM CT datasets: Can endograft sizing be automated for complex anatomy?." Journal of vascular surgery 47.6 (2008): 1306-1312.

Saito, Toyofumi, and Jun-Ichiro Toriwaki. "New algorithms for euclidean distance transformation of an n-dimensional digitized picture with applications." Pattern recognition 27.11 (1994): 1551-1565.

Jones, Mark W., J. Andreas Baerentzen, and Milos Sramek. "3D distance fields: A survey of techniques and applications." IEEE Transactions on visualization and Computer Graphics 12.4 (2006): 581-599.

Hernandez-Hoyos, Marcela, et al. "Computer-assisted analysis of three-dimensional MR angiograms." RadioGraphics 22.2 (2002): 421-436.

Mourgues, Fabien, et al. "Interactive guidance by image overlay in robot assisted coronary artery bypass." International Conference on Medical Image Computing and Computer-Assisted Intervention. Springer, Berlin, Heidelberg, 2003.

Langs, Georg, et al. "Building and registering parameterized 3d models of vessel trees for visualization during intervention." Pattern Recognition, 2004. ICPR 2004. Proceedings of the 17th International Conference on. vol. 3. IEEE, 2004.

Pan, Mian, and Gisela Klette. A revision of a 3D skeletonization algorithm. CITR, The University of Auckland, New Zealand, 2004.

European Search Report for EU Patent Application No. 11193613.4, dated Feb. 22, 2012, pp. 1-11.

Siddiqi, Kaleem, et al. "Hamilton-jacobi skeletons." International Journal of Computer Vision 48.3 (2002): 215-231.

Weisstein, "Vector Derivative", Wolfram Mathworld 2010, Retrieved from the internet: URL:http://mathworld.wolfram.com/vectorderivative.html [retrieved on Oct. 25, 2010].

The first substantive examination report issued by the European Patent Office dated Nov. 3, 2010 for European Application No. 08 769 842.9, filed May 30, 2008, 7 pages.

International Search Report for the corresponding PCT Application No. PCT/US2008/065198, dated Jan. 29, 2009, pp. 1-8.

\* cited by examiner

AUTOMATED CENTERLINE EXTRACTION METHOD AND GENERATION OF CORRESPONDING ANALYTICAL EXPRESSION AND USE THEREOF

RELATED APPLICATIONS

This application is a continuation of U.S. application Ser. No. 14/727,157, filed Jun. 1, 2015 and entitled AUTOMATED CENTERLINE EXTRACTION METHOD AND GENERATION OF CORRESPONDING ANALYTICAL EXPRESSION AND USE THEREOF, which is a continuation of U.S. application Ser. No. 12/673,089, now U.S. Pat. No. 9,047,685, filed Feb. 11, 2010, and entitled AUTOMATED CENTERLINE EXTRACTION METHOD AND GENERATION OF CORRESPONDING ANALYTICAL EXPRESSION AND USE THEREOF, which is a 371 application of PCT/US2008/065198, filed 30 May 2008, which claims the benefit of U.S. Provisional Patent Application No. 61/029,934, which was filed on Feb. 20, 2008, and entitled AUTOMATED CENTERLINE EXTRACTION METHOD AND GENERATION OF CORRESPONDING ANALYTICAL EXPRESSION, and which also claims the benefit of U.S. Provisional Patent Application No. 60/932,213, which was filed on May 30, 2007 and entitled AUTOMATED CENTERLINE EXTRACTION METHOD AND GENERATION OF CORRESPONDING ANALYTICAL EXPRESSION. Each of the above-identified applications is incorporated herein by reference.

TECHNICAL FIELD

The present invention relates generally to image processing and, more particularly, to a method and system to extract a centerline of an object, such as three-dimension tubular structure.

BACKGROUND

Anatomical information can be obtained through the use of a variety of imaging modalities, such as computed tomography (CT), computed axial tomography (CAT), and magnetic resonance imaging (MRI). These and other imaging modalities obtain substantial amounts of imaging data corresponding to numerous slices through a region of a patient's body. The imaging data can allows for construction of a three-dimensional volumetric data set representing the various structures in a given area of a patient's body subject to the scan. Existing techniques can be utilized for rendering a two- or three-dimensional volume of the anatomical structures, such that arbitrary points or regions of interest can be viewed. The information from the scans can thus be analyzed as part of a diagnosis to determine an appropriate course of treatment.

One particular application of such imaging data is to examine tubular internal body structures, such as the aorta, colon, and the like, for procedural planning purposes. The planning can include preparation for repair or reconstruction of such structures. An integral part of such planning typically involves a determination of sizing and geometry of internal tubular structures based on the imaging data acquired for a given patient. Currently, sizing of many support structures (e.g., vascular endografts) is a labor-intensive process with the potential to be error-prone. For instance, many existing measurement techniques tend to be imprecise, are frequently difficult to reproduce, and require a great amount of user interaction. Another weakness of many existing approaches is that there is no analytical definition of the geometry and topology of the patient's anatomy. Many advances have occurred in image analysis; however, these advances have generally permitted the application of endovascular repair to more complex anatomy rather than simplifying the process.

As an example, a proper sizing requires a skilled operator to use a sophisticated imaging workstation for making all the necessary measurements. The results of many existing approaches thus depend largely on the judgment and care of the user and, thus, may vary from application to application. Existing methods measure the vascular diameters in the acquired 2D slices. However, the orientation of these slices is not necessarily orthogonal to the tube-like structure under measurement. This limitation can cause inaccurate diameter and length measurements.

SUMMARY

The present invention relates generally to image processing and, more particularly, to a method and system to extract a centerline of an object, such as three-dimension tubular structure. The extracted centerline can be utilized to generate an analytical expression for the centerline, based on which an analytical expression can be determined for a surface of the tubular structure.

One aspect of the present invention provides a computer implemented method for determining a centerline of a three-dimensional tubular structure. The method includes providing an edge-detected data set of voxels that characterize a boundary of the tubular structure according to a three-dimensional voxel data set for the tubular structure. A gradient field of a distance transformation is computed for the edge-detected dataset. A voxel data set corresponding to the centerline of the tubular structure is computed according to derivative of the gradient field.

Another aspect of the present invention may provide an image processing system. The system can include a distance transform programmed to compute a distance transformation for an edge detected data set, the edge detected data set including voxels that represent a three-dimensional volume that includes a structure of interest. A gradient operator is programmed to compute a gradient vector field of the distance transformation. A centerline extractor is programmed to identify a voxel data set corresponding to a centerline of the structure of interest based on the gradient vector field. As an example, a derivative of the gradient vector field can be computed, such that the centerline extractor identifies the centerline based on the derivative of the gradient vector field.

The analytical expression can be used to design an implantable device that is dimensioned and configured according to the analytical expression. Additionally or alternatively, the analytical expression can be fused with another image, such as can be used intraoperatively. The shape of an elongated device (e.g., a steerable catheter) can be determined as a function of the analytical expression, which determination can be utilized to configure and guide the elongated device to a desired anatomical position in a patient.

DETAILED DESCRIPTION

Figure 1:
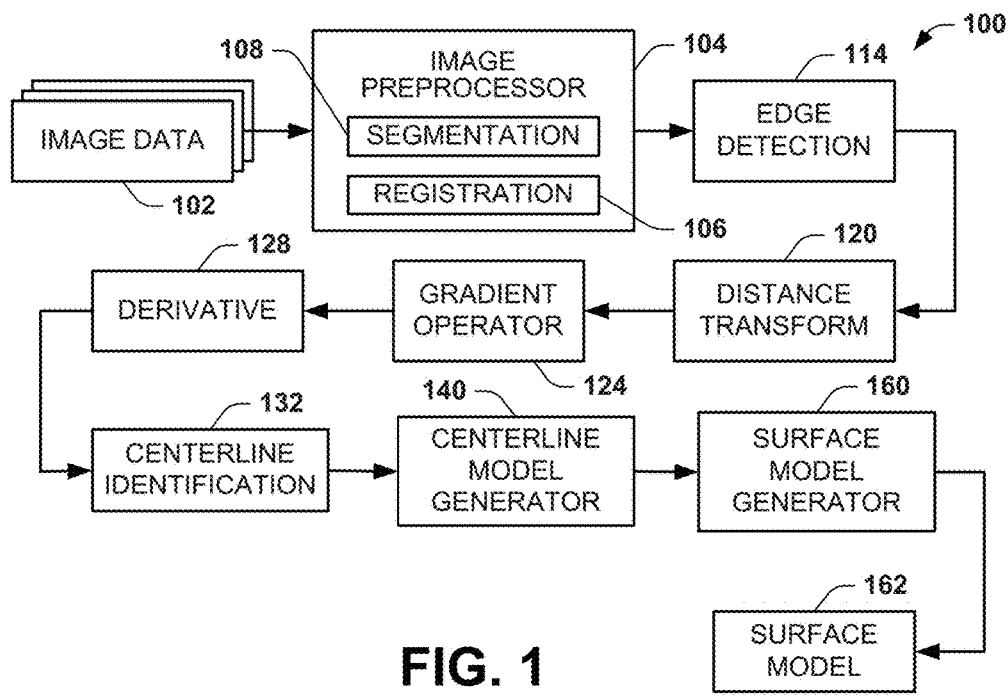
FIG. 1 is an example of an image processing system that can be implemented according to an aspect of the invention.

The present invention relates generally to an automated centerline extraction process that can be utilized to ascertain an analytical model or expression that describes the geometry of a curved path. As one example, the curved path may correspond to an anatomical tubular structure, such as including an arterial lumen (e.g., the aorta) and associated branches. The centerline extraction process includes computing a gradient field of a distance transformation determined for an edge-detected image dataset for a given tubular structure. The vector gradient field can be differentiated (e.g., using a scalar derivative) to identify a voxel data set that forms the centerline of the structure. The centerline voxel data set can be utilized to generate an analytical expression of the lumen's centerline, such as a spline (e.g., a basis-spline) model. The spline model (or other analytical expression) of the centerline can be used, in conjunction with previously acquired segmented image data for the structure, to generate a corresponding analytical expression for the entire surface of the lumen. The approach described herein can be employed to automate the generation of complex endovascular graft planning data as well as to facilitate repair of a variety of anatomical structures. For instance, the resulting analytical expression for the centerline and the surface of the lumen can provide an accurate representation of the anatomical structure applicable in a variety of diagnostic techniques and methods. Additionally or alternatively, the analytical expression can be fused with another image, such as can be used intraoperatively. The shape of an elongated device (e.g., a steerable catheter) can be determined as a function of the analytical expression, which determination can be utilized to configure and guide the elongated device along a path to a desired anatomical position in a patient. An implantable device can also be dimensioned and configured as a function of the analytical expression.

As will be appreciated by those skilled in the art, portions of the invention may be embodied as a method, data processing system, or computer program product. Accordingly, these portions of the present invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, flash memory devices, and magnetic storage devices.

Certain embodiments of the invention are described herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer or workstation, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

FIG. 1 depicts an example of an image processing system 100 that can be utilized to identify a centerline of a tubular structure. The system 100 can also be employed to generate an analytical expression or centerline model based on the identified centerline. The system further can generate a corresponding surface model that parameterizes the surface of the tubular structure based on the centerline model.

The system 100 employs raw image data 102 such as may be obtained by computed axial tomography (CAT) or computed tomography (CT). The approach described herein relates to post-processing of the image data 102, such that different techniques and equipment can be utilized to acquire the image data. Those skilled in the art will understand and appreciate various types of scanners that can be utilized to acquire the image data 102, including CT scans, magnetic resonance imaging (MRI) or other 3D imaging modalities. The scan or a series of scans can be performed over a portion of a patient's body that includes an anatomical structure of interest to provide the image data 102.

As one example, the image data 102 can include a native voxel data set for a region of interest and a contrast voxel data set for the same region. The respective voxel data sets can be acquired for a given patient at different times. For instance, the contrast voxel data set can be acquired after injecting the patient with a contrast material, such as an x-ray die. As a result of the scans occurring at different times, the coordinates of the structures in the respective scans may not correspond directly to each other. Such mismatch may be due to external movement of the patient, internal movement of the patient's organs or movement of the scanner's sensing array.

For sake of simplicity of explanation, much of the remaining discussion is described in relation to image data that includes a tubular anatomical structure in the form of an arterial lumen; namely, the aorta and its associated branches. It will be further appreciated that the approach described herein is not limited to any particular anatomical structure as the approach is generally applicable to any generally tubular structure that may be considered to have a centerline and an exterior. The tubular structure can include one or more branches, each of which can follow a complex or tortuous curved path. The approach described herein can also be implemented to generate an analytical expression for tubular structures that may be moveable between different orientations as may occur over a period of time. Stated differently, the image data 102 can correspond to a series of scans, such as may be considered 4D scans (e.g., a 3D CAT scan including a temporal dimension), for which one or more analytical expressions can be generated.

The system 100 includes an image preprocessor 104 that is programmed and/or configured to perform predetermined pre-processing on the image data 102. In the example of FIG. 1, the preprocessor 104 includes a registration block 106 and a segmentation block 108. The registration block 106 can include methods and operations programmed to register the contrast and native image sets to each other so that the correspondence between points in voxels in the respective data sets are known. As one example, the registration block can employ a maximization algorithm, such as in which a registration quality of a particular pair of data sets in the respective images can be determined. For example, the closeness of the match between data sets A(x, y, z) and B(x, y, z) can be identified by a quality factor Q, which can be expressed as follows:

$$Q = \sum_{x,y,z} \sqrt{A(x)B(x)} \qquad \text{Eq. 1}$$

The registration block 106 thus can employ metrics to reward peaks that match other peaks and as well as to indirectly penalize valleys that do not match other valleys. A search algorithm may be employed to identify which of the values maximizes the quality function Q. A corresponding translated data set can then be generated.

The preprocessor 104 can also include a segmentation block that can be programmed to segment or separate the desired anatomical structure from the rest of the image set. As one example, a segmentation process may utilize intensity cropping, intersecting data-sets and computing connected components. The segmentation process can be partially or fully automatic process. The intensity cropping can be employed as a preliminary part of the segmentation process by cropping the image according to intensity. The intensity cropping procedure can be performed on both input data sets—the native voxel data set and the contrast voxel data set. As a further example, upper and lower intensity bounds can be defined by the user to provide real time feedback commensurate with the results of the cropping operation.

Figure 2:
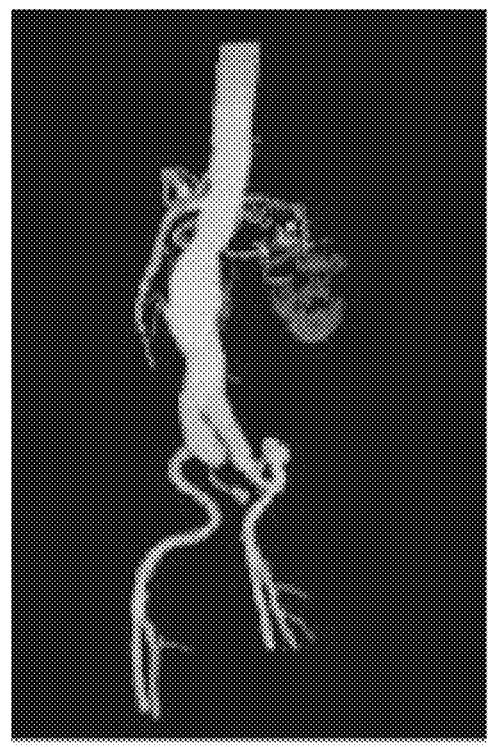
FIG. 2 depicts an example of a segmented image that can be generated according to an aspect of the invention.

Because intensity cropping individually may not sufficiently segment the volume of interest from the remaining image data, segmentation block further may include a method for intersecting the volumes of the two image data sets. For instance, the intersecting can be implemented by taking the intensity-cropped arterial scan and removing voxels not present in the intensity-cropped native scan. The remaining data represents a volume closer to the isolated arterial lumen. The segmentation process may further include computing a connected component. As one example, a neighbor relation can be defined on the voxel set, which relation can be utilized to isolate connected components. For the example of an arterial lumen, the connected component will contain closely isolated arterial lumen with few distractions. An example of a segmented arterial lumen is depicted in FIG. 2, indicated at 110.

The system 100 may further include an edge detection method 114. The edge detection method 114 is programmed to identify voxels at the borders of the volume in the segmented image data provided by the image preprocessor 104. The edge detection method 114 generates an edge-detected data set that identifies the voxels at the border of the tubular structure. The voxels at the border of the lumen, as contained in the edge detected data set, identify contours that characterize the shape of the tubular structure.

Figure 3:
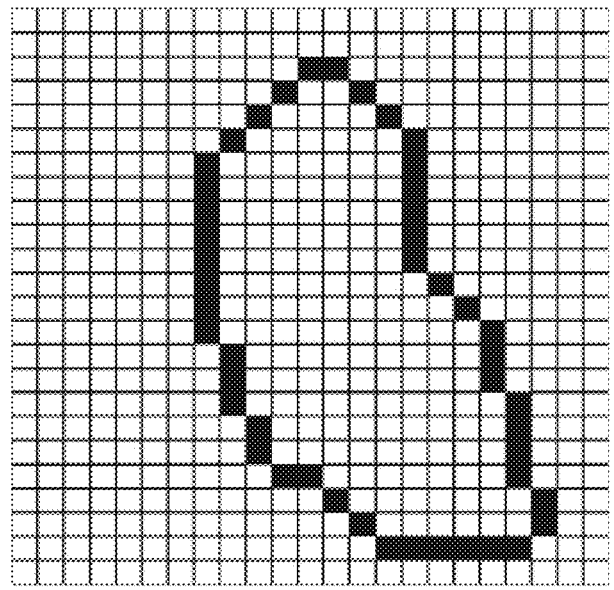
FIG. 3 depicts a graphical example of part of an edge-detected data set that can be computed according to an aspect of the invention.

Those skilled in the art will understand and appreciate various edge-detection algorithms that have been developed, which can be utilized for providing the edge-detected data set. Examples of edge detection methods 114 may range from relatively simple threshold with spatial derivative to more complex iterative procedures that include derivations based on statistical analysis. However, it will be appreciated that in many cases the segmented image data for anatomical tubular structures, such as arterial lumens and colons, are sufficiently structured such that simpler edge detection may be sufficient. For instance, the edge-detection method 114 can be employed to mark voxels at the borders of the segmented tubular structure, such as by iterating over each voxels neighbor in the segmented data set for the tubular structure. If any voxel is not within the tubular structure or lumen, it is marked as a border. Such an efficient process can be performed in linear time. An example of a graphical representation of an edge detected data set for a given slice of the segmented image is depicted in FIG. 3, as indicated at 116.

The system 100 also includes a distance transformation 120 that is programmed to compute a distance transform for the edge-detected data set provided by the edge detection block 114. For example, with the edge-detected data set defining the border or edge of the tubular structure, the distance transformation 120 can apply a metric to identify the distance each image element or voxel is from a nearest feature or voxel in the border. The distance transformation 120 can convert the edge detected data set from a binary or Boolean image (FIG. 3) into a corresponding gray-level image (FIG. 4), in which the values associated with each of the voxels corresponds to its distance from its nearest border feature. Alternatively, the distance transform can endow the edge-detected data set with an additional field representing the computed distance information. For the example of a tubular structure, the resulting distance transform can be a three-dimensional distance transform (DT). As a further example, the distance transformation 120 can generate the three-dimensional DT as a scalar field that satisfies the Eikonal equation:

$$|\nabla DT| = 1 \quad \text{Eq. 2}$$

with the boundary conditions:

$$B(i,j,k) = \Rightarrow DT(i,j,k) = 0.$$

Those skilled in the art will understand and appreciate various distance metrics that can be utilized by the distance transformation 120 to provide a corresponding distance transform of the edge detected data set. For example, the distance transformation 120 can be programmed to employ a Manhattan distance metric, a Euclidean distance metric, a Chebyshev distance metric or other distance metrics that may be known or yet to be developed.

Figure 4:
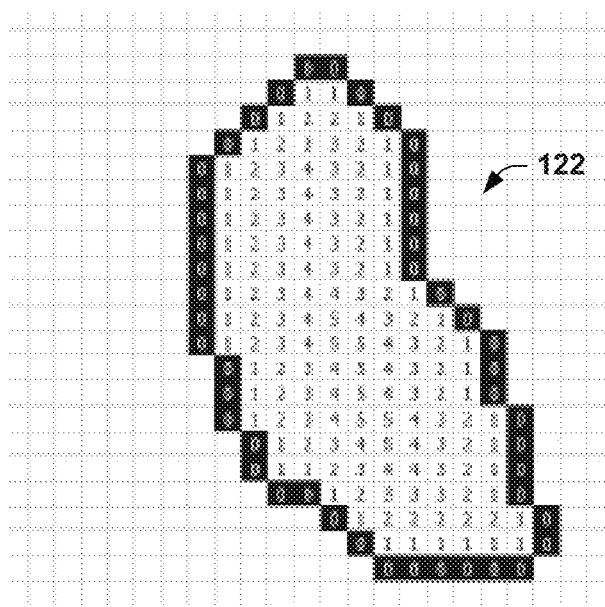
FIG. 4 depicts a graphical example of a distance transform that can be computed for part of a voxel data set according to an aspect of the invention.

FIG. 4 depicts an example graphical representation of a distance transform, indicated at 122, in which the distance transform has been superimposed over the edge detected data set of FIG. 3. The values of the image elements correspond to the distance values determined by the distance transformation 120. The representation of the distance transform depicts zeroes at the boundary of the structure, with the values increasing smoothly as one moves away from the boundary.

Referring back to FIG. 1, the system 100 also includes a gradient operator 124 that is programmed to compute a gradient field of the distance transform generated by the distance transformation 120. The 3-D derivative resulting from the gradient operation represents how the field is changing with respect to the linear dimensions. A mathematical definition of the gradient operator 124 can be expressed in Cartesian coordinates for 3-D scalar space as follows:

$$\nabla F = \frac{\delta F}{\delta x}\hat{x} + \frac{\delta F}{\delta y}\hat{y} + \frac{\delta F}{\delta z}\hat{z} \quad \text{Eq. 3}$$

where F corresponds to the scalar distance transform.

Those skilled in the art will understand and appreciate that the gradient operator 124 typically is a continuous function. Due to the discrete nature of the data being processed and in order to maintain symmetry, the 3-D gradient of the scalar distance transform can be approximated as follows:

$$\nabla F(i,j,k) \approx (F(i+1,j,k) - F(1,j,k))\hat{x} + (F(i,j+1,K) - F(i,j-1,k))\hat{y} + (F(i,j,k+1) - F(i,j,k-1))\hat{z} \quad \text{Eq. 4}$$

The gradient operator 124 thus generates a corresponding distance transform vector gradient field for the scalar distance transform. Because of the highly structured form of the distance transformation, the gradient yields a unit vector for each voxel.

Figure 5:
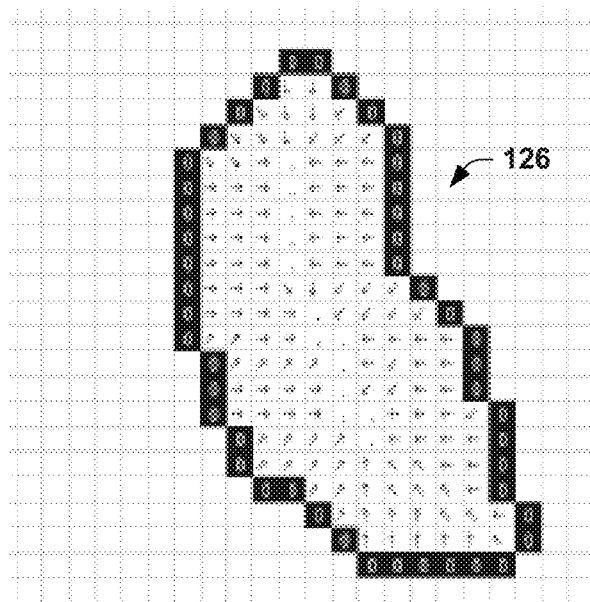
FIG. 5 depicts a graphical example of a distance transform gradient that can be determined for the distance transformation of FIG. 4 according to an aspect of the invention.

An example of a corresponding distance transform vector gradient field, indicated at 126, is depicted in FIG. 5. As shown in FIG. 5, for every voxel inside the boundary of the structure, the resulting vector field points towards the centerline. Because, the vector gradient field always points towards the centerline, the direction of the vector gradient changes rapidly at the centerline. The system 100 also includes a derivative block 128 programmed to quantify this change in direction. The derivative block 128 computes a derivative of the gradient vector field provided by the gradient operator 124. The derivative block 128 computes the derivative by differentiating the gradient vector field provided by the gradient operator 124. The resulting derivative provides a measure of how the gradient vector field changes, which facilitates extracting the centerline.

As one example, the derivative block 128 can be programmed to compute a scalar derivative of the gradient vector field. While such an approach (computing a scalar derivative of a vector field) may be considered mathematically peculiar, the scalar derivative of the vector field enables identification of voxels (by a centerline identification block 132) according to where the gradient of the distance transform changes rapidly. The scalar derivative, for example, can be computed using neighborwise dot products. As described herein, the gradient vector field is highly structured since the distance transformation satisfies the Eikonal equation as discussed above (see, e.g., Eq. 2). The highly structured nature of the gradient vector field results in neighboring vectors that differ only in direction. Consequently the derivative computation need only detect a rapid change in direction in the vector field to identify which voxels correspond to the centerline.

By way of further example, when looking at a particular slice of image data, such as the distance transform gradient of FIG. 5, the derivative computation can be implemented by performing the neighborwise dot product of a given voxel (or image element) relative to the top, bottom, left and right neighboring voxels. Alternatively or additionally, diagonal neighbors can be utilized as part of the neighborwise dot product computation for computing the scalar derivative.

Figure 6:
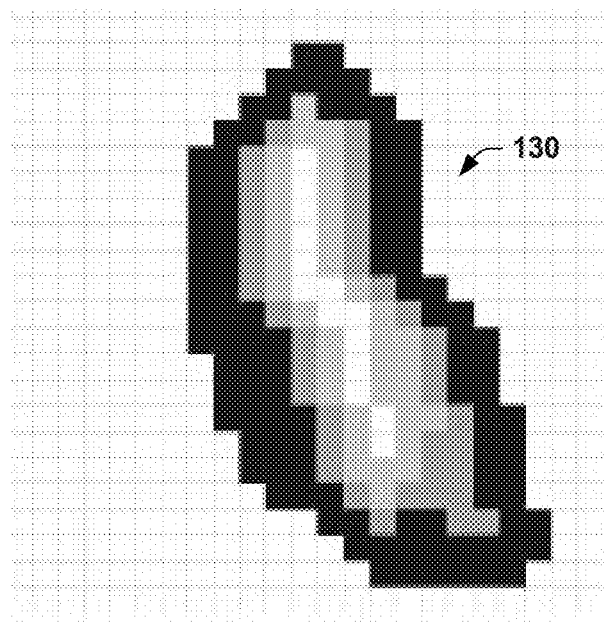
FIG. 6 depicts a graphical example resulting from performing a derivative of the distance transform gradient of FIG. 5 according to an aspect of the invention.

FIG. 6 depicts a gray scale image representation of the scalar derivative, indicated at 130, computed for the gradient vector field of FIG. 5. Since the computed derivative provides a measure of relative change in direction, the centerline can be identified as including a set of one or more contiguous voxels having the highest values. In the example of FIG. 6, the centerline of the structure corresponds to the white area near the center.

For automated centerline identification, the system 100 can include a centerline identification block 132 that is programmed to identify the centerlines based on the derivative of the gradient vector field. For example, the centerline identification block 132 can be programmed to perform thresholding or other characterizations on the scalar derivative field. The thresholding further may be followed by a Boolean subtraction of the borders, to provide an accurate reconstruction of the centerline of the tubular structure. The identified centerline thus can be provided as a voxel data set for subsequent analysis.

Figure 8:
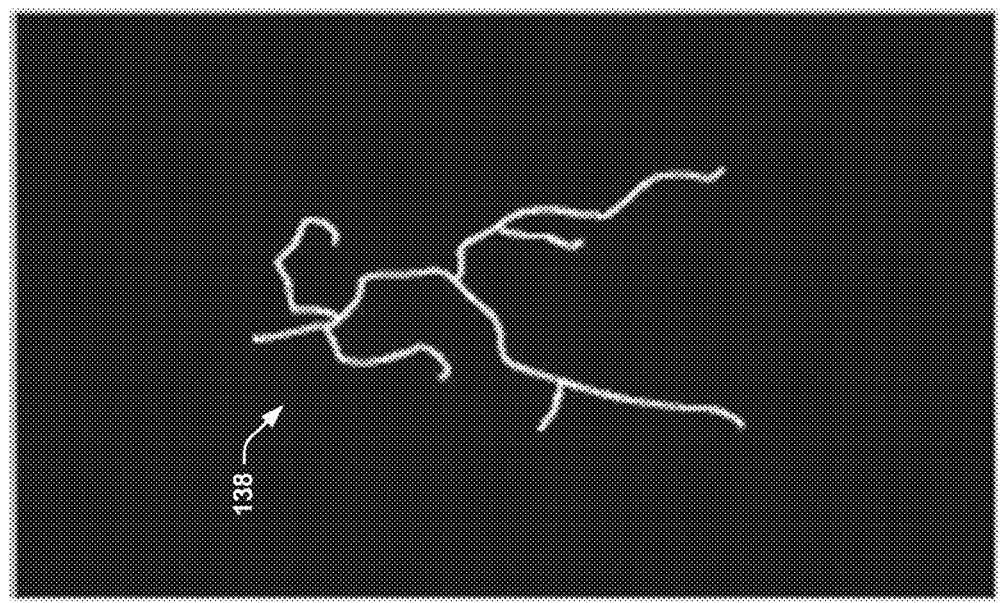
FIG. 8 depicts an example of a centerline of an arterial lumen that can be identified in accordance with an aspect of the invention.
Figure 7:
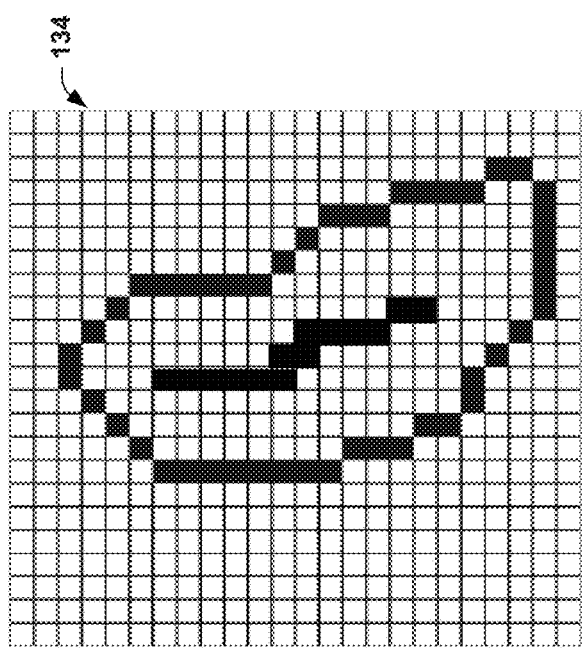
FIG. 7 depicts an example representation of part of a voxel data set illustrating part of a centerline identified from the derivative of FIG. 6.

FIG. 7 depicts an example a graphical representation 134 of an identified centerline 136 overlaid on a corresponding edge-detected image for part of a tubular structure (e.g., the border has not been subtracted out). The set of one or more voxels that define the centerline thus can be identified in the segmented data (from the image pre processor 104) to provide a voxel data set corresponding to the centerline for a plurality of scan slices acquired for the tubular structure. FIG. 8 depicts graphical representation 138 of a centerline for an arterial lumen (e.g., the descending aorta), such as can be stored as a voxel data set (e.g., in the form of a voxel array).

The identified centerline can be utilized as a part of further processing to determine the complete geometry of the tubular structure, including its surface and associated branches. The system 100 thus includes a centerline model generator 140 that is programmed to derive an analytical expression (or model) corresponding to the centerline. As described herein, the analytical expression for the extracted centerline further can be processed to compute an analytical expression for the surface based on the segmented data and the analytical expression for the centerline.

As an example, the centerline model generator 140 is programmed to produce an analytical expression of the centerline based on the voxel data set generated by the centerline identification block. It will be understood that the resulting centerline image may not exhibit is thinness, but may be more than one voxel thick. This characteristic thus is considered when deriving the analytical expression for the centerline.

By way of further example, the centerline model generator 140 can perform a "marching" procedure. The procedure begins at one end (e.g., corresponding to a top or proximal end) of the tubular structure and iterate downwards, using a flood-fill type of algorithm. Because of the highly structured narrow form of the centerline voxel dataset, the centerline model generator 140 reliably iterates along the axis of the tubular structure, and accurately determines the geometric properties of the centerline. The algorithm can be visualized as a propagating wave front. The wave front begins in the topmost slice and, at every iteration, propagates along the centerline, maintaining a cohesive structure. A split of the advancing wave front into more than one connected subcomponent occurs at the point where the centerline splits due to a branch. This predictable behavior of the marching procedure further can be exploited to extract the geometric knots, such as may be identified at periodically occurring locations along the centerline. The distance between such knots may be a tunable parameter. The center-of-mass of the marching wave front can be monitored and the center-of-mass can be periodically recorded as defining a corresponding geometric knot. If the wave front divides, the largest portion is retained as corresponding to the main branch and the remaining connected subcomponents begin new branches.

Figure 9:
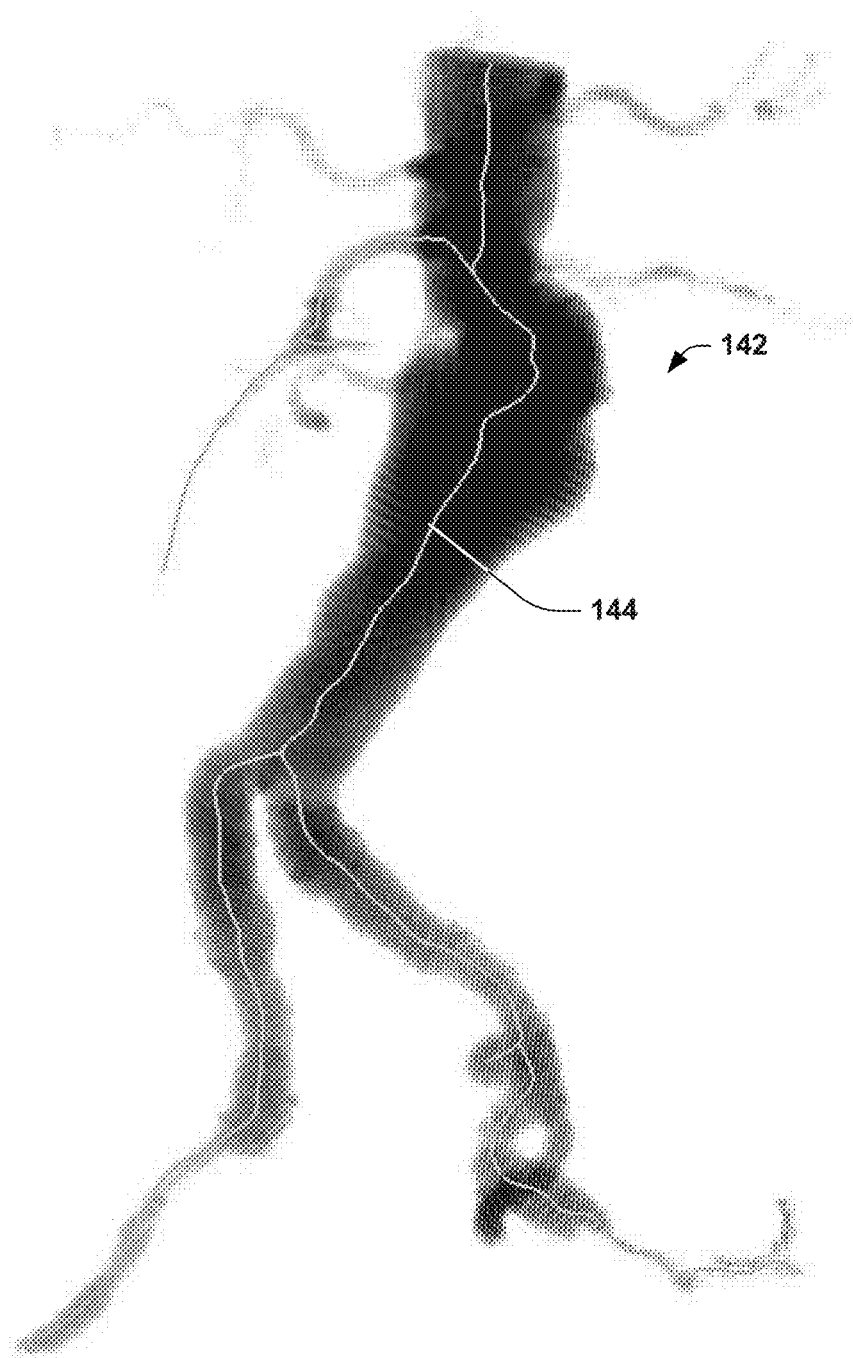
FIG. 9 depicts an example of an analytical centerline overlaid on a segmented image of an arterial lumen according to an aspect of the invention.

The centerline model generator 140 can produce a spline model (e.g., a basis or B-spline model) of the centerline as a function of the extracted geometric knots. By way of further example, the centerline model generator 140 can use uniform cubic B-splines to represent the centerline geometry of the tubular structure. For instance, a spline inversion algorithm allows a spline curve to be fit to the centers-of-mass that is recorded in the marching process. An example of an analytical centerline 144 is shown in FIG. 9 overlaid on the original data from the intensity-cropped arterial scan, indicated at 142. The analytical centerline that is produced by the centerline model generator 140 according to an aspect of the invention provides a good basis for the construction of an accurate analytical surface model for the tubular structure.

As described herein, the tubular structure can include one or more branches. Each branch of the tubular structure can represented as a separate list of recorded centers-of-mass, forming a separate set of geometric knots for each branch. To ensure that the centerline of the entire tubular structure is representative of the correct geometry, the centerlines of each branch should form a single continuous structure without gaps. To achieve such continuity, the centerline of child branches can be "stitched" to the centerline of their parent branches by a performing an association procedure. As one example, the centerline of each child branch (except for the first or main branch) can be given one additional geometric knot placed ahead of the rest. This additional knot can be selected from the parent's centroid list such that both the slope and knot spacing of the branch are preserved as much as possible. These contradictory requirements can be balanced against one another using an empirically determined regularization parameter.

Figure 10:
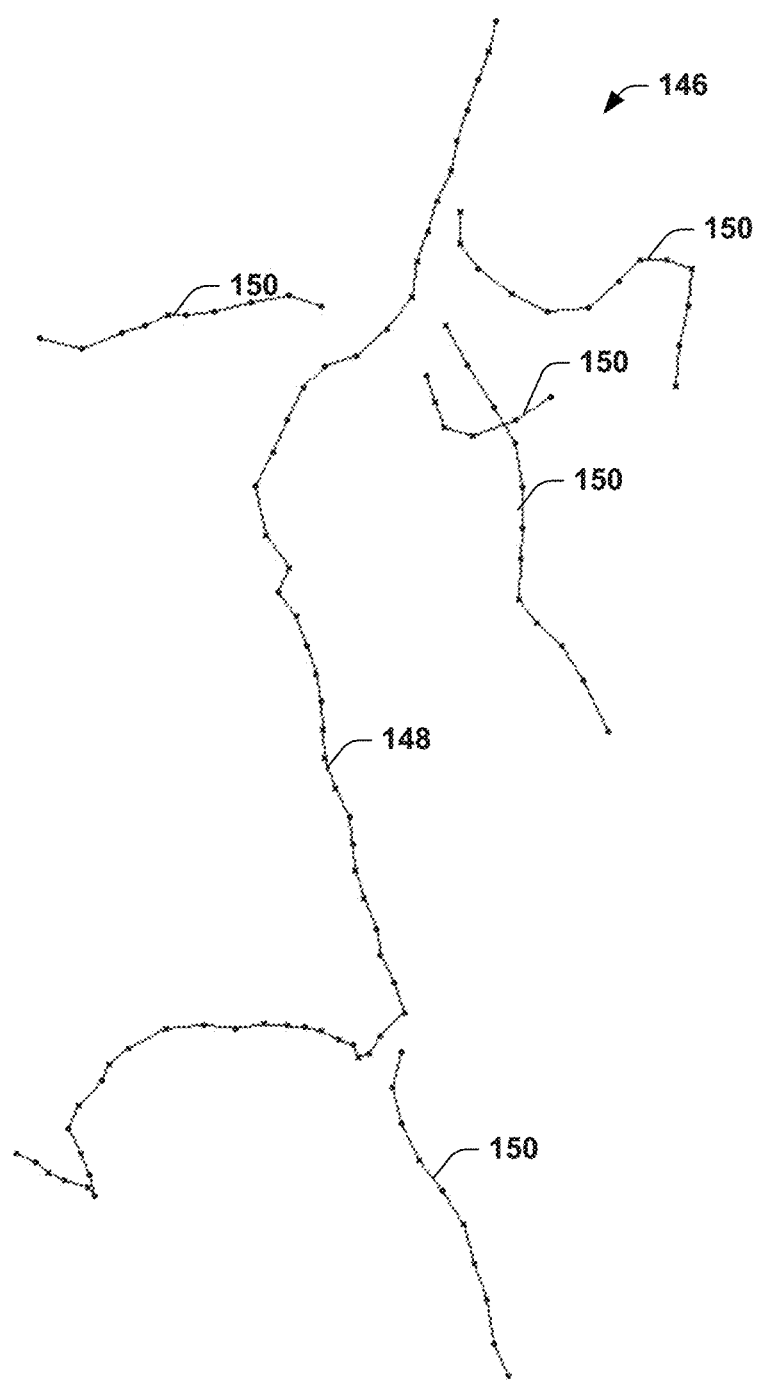
FIG. 10 depicts a graphical example of analytically-fit centerlines for an aorta and branch vessels that can be generated according to an aspect of the invention.

FIG. 10 depicts an example of a graphical representation of a centerline 146 that can be defined by an analytical expression for an arterial lumen. In the example of FIG. 10, the centerline includes a main branch 148 and a plurality of child branches 150. Each branch 148 and 150 further includes geometric knots, such as can be determined through a marching process described herein. The spacing between adjacent knots along the centerline can be a tunable parameter.

Returning to FIG. 1, a surface model generator 160 is programmed to compute a surface model 162 corresponding to an analytical representation of the surface of the tubular structure based on the analytical expression of the centerline. The surface model generator 160 can perform a surface fitting procedure that leverages the accurate analytical centerline to compute an analytical surface appropriate for the topology of the lumen. Since the approach described herein produces an accurate analytical centerline model, the accuracy of the resulting surface model 162 can be high relative many existing approaches. Such a surface model can be of great utility in applications involving visualization, simulation, and prosthetic design. For example, the analytical surface model 162 can be utilized by standard engineering and analysis tools, such as computer aided drawings tools, finite element analysis and the like.

The surface model 162 can also be converted into a corresponding image representation that can be utilized by an imaging system, such as may be part of an intraoperative imaging (e.g., angio) system or an image processing system running as instructions on a PC or workstation. This can be implemented, for example, by exporting the analytical surface model 162 as a numerical representation in a desired format to define the three-dimensional surface model. The numerical representation can be converted to an appropriate image representation in a suitable format for graphical display (e.g., as a wire frame or mesh). The resulting image derived from the model can be registered with or superimposed onto another image for analysis and evaluation. Thus, the model can be generated, converted into an appropriate format of image data, such as to enable use in real time intraoperative procedures.

The surface fitting procedure can compute mathematical expressions that represent each branch of the tubular structure as a lofted B-spline surface. The surface, for example, is defined by a series of two-dimensional slices, each encoded as a periodic B-spline. Each of the slices can be computed by constructing local aligned coordinate systems at key points periodically placed along the centerline. The spacing between adjacent points along the centerline can be tunable parameter. The key points, for example, can correspond to the geometric knots of the centerline defined by the centerline model or the spacing between such points can be determined independently of the knots determined for the centerline model.

Figure 11:
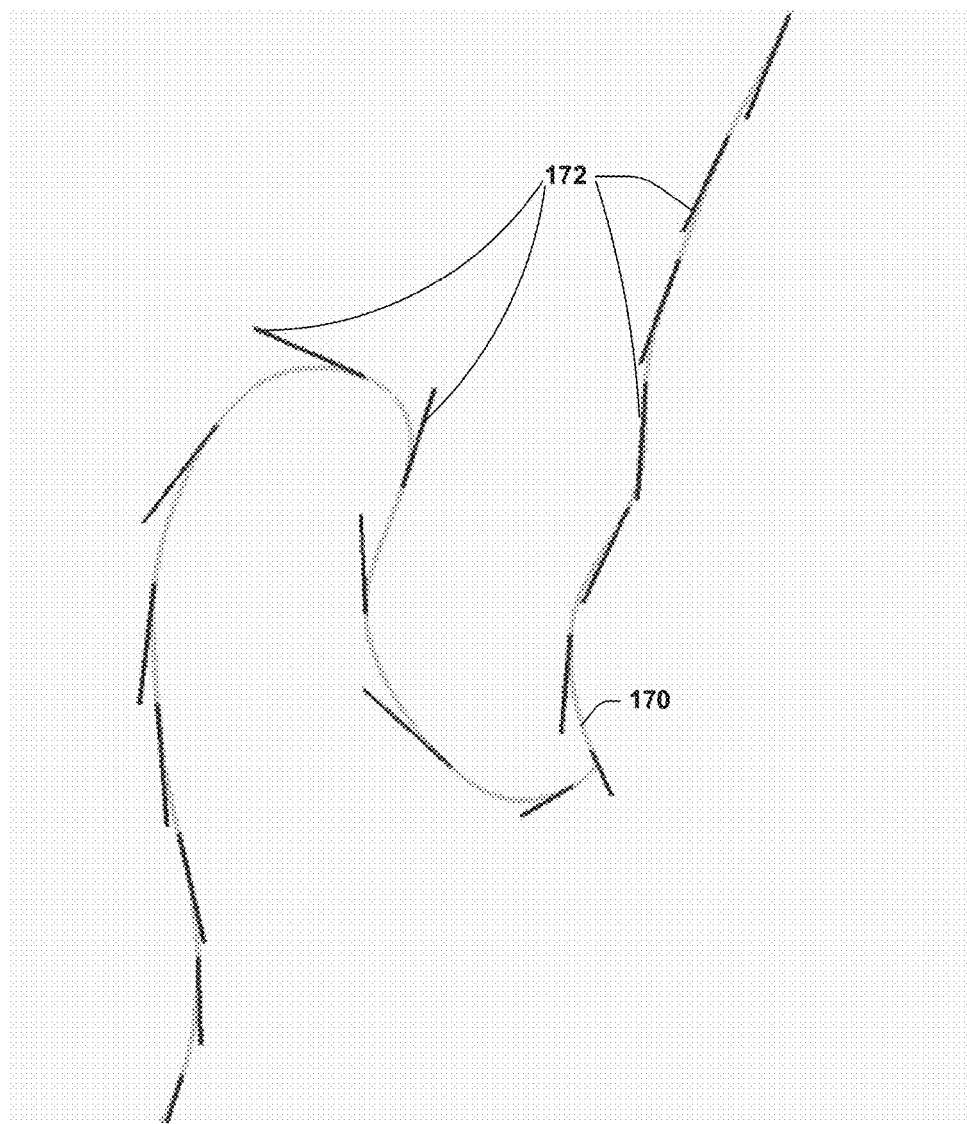
FIG. 11 depicts an example of a portion of a centerline with periodic tangent lines drawn along the centerline according to an aspect of the invention.

FIG. 11 depicts representation of a centerline 170, such as can be derived as described herein. Tangent lines 172 are determined for the key points along the centerline 170. The spacing between points along the centerline shown in FIG. 11 is for simplification of illustration, as a tighter spacing between adjacent points typically is employed to improve accuracy of the resulting surface model 162.

Figure 12:
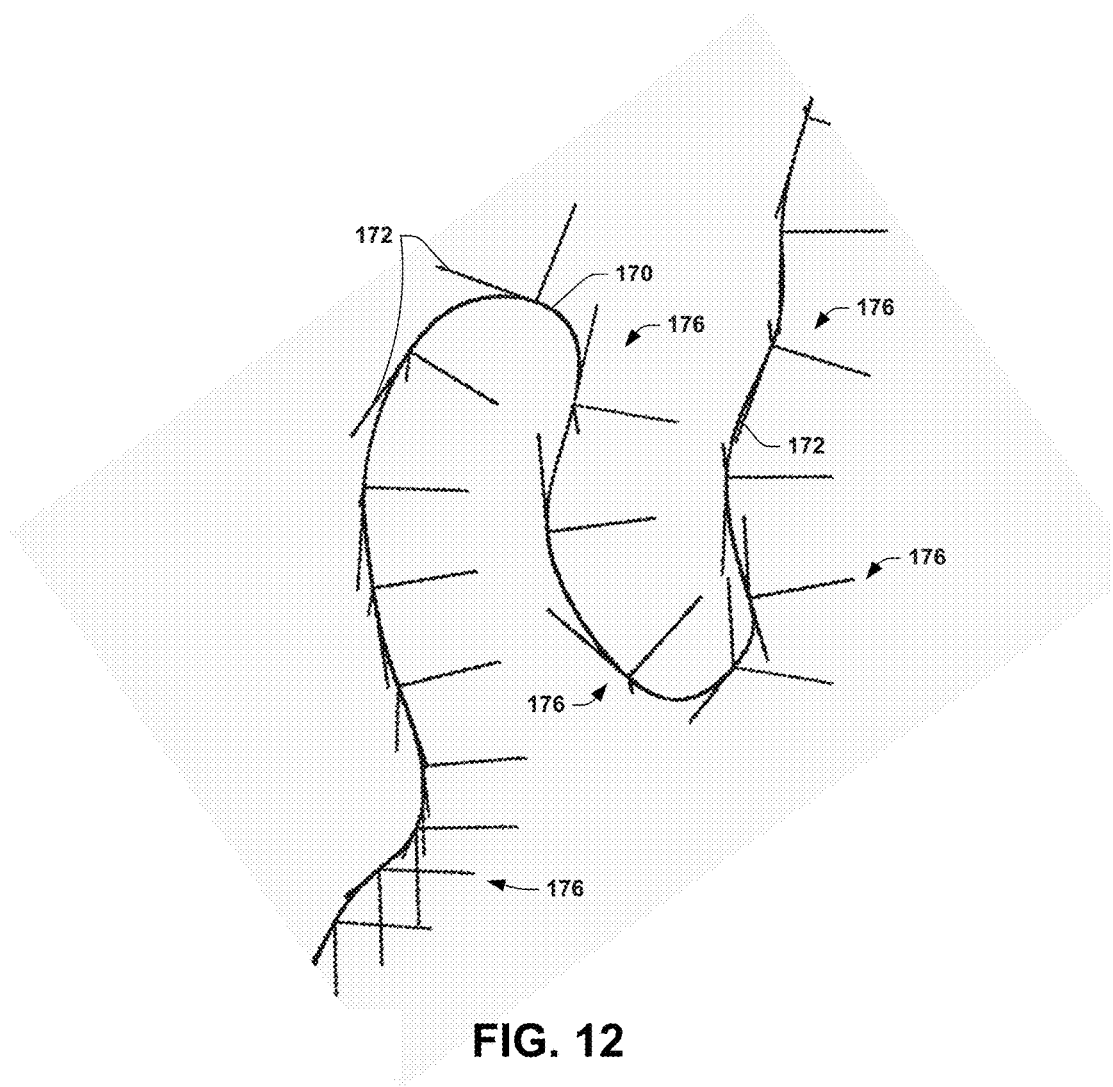
FIG. 12 depicts an example of a portion of a centerline and local coordinate axes distributed along the centerline according to an aspect of the invention.

In FIG. 12, local coordinate systems 176 are shown at the key points along the centerline 170. The local coordinate systems 176 are depicted as two-dimensional Cartesian coordinate systems orthogonal to respective tangent lines 172. It will be appreciated that the angular difference between the tangential lines in adjacent slices corresponds to the relative amount of curvature between the points at which the tangential lines are located. The local coordinate systems 176 can be arranged relative to each other using a common clock system in which the origin (e.g., midnight) in each local coordinate system is the same in all slices. Each local coordinate system thus defines a two-dimensional slice that is utilized to drive a marching algorithm that locates the surface boundary relative to the points along the centerline. The boundaries of each slice can be determined based on the data produced by the image pre-processor 104, such as corresponding to segmented image data. For instance, the algorithm marches radially outward from the centerline of the lumen until it reaches an edge or border of the segmented volume. The boundary between the final internal voxel and the first external voxel is then marked as a geometric knot corresponding to a point along the boundary of the surface. A plurality of such geometric knots are determined to represent the surface geometry at each slice.

Figure 13:
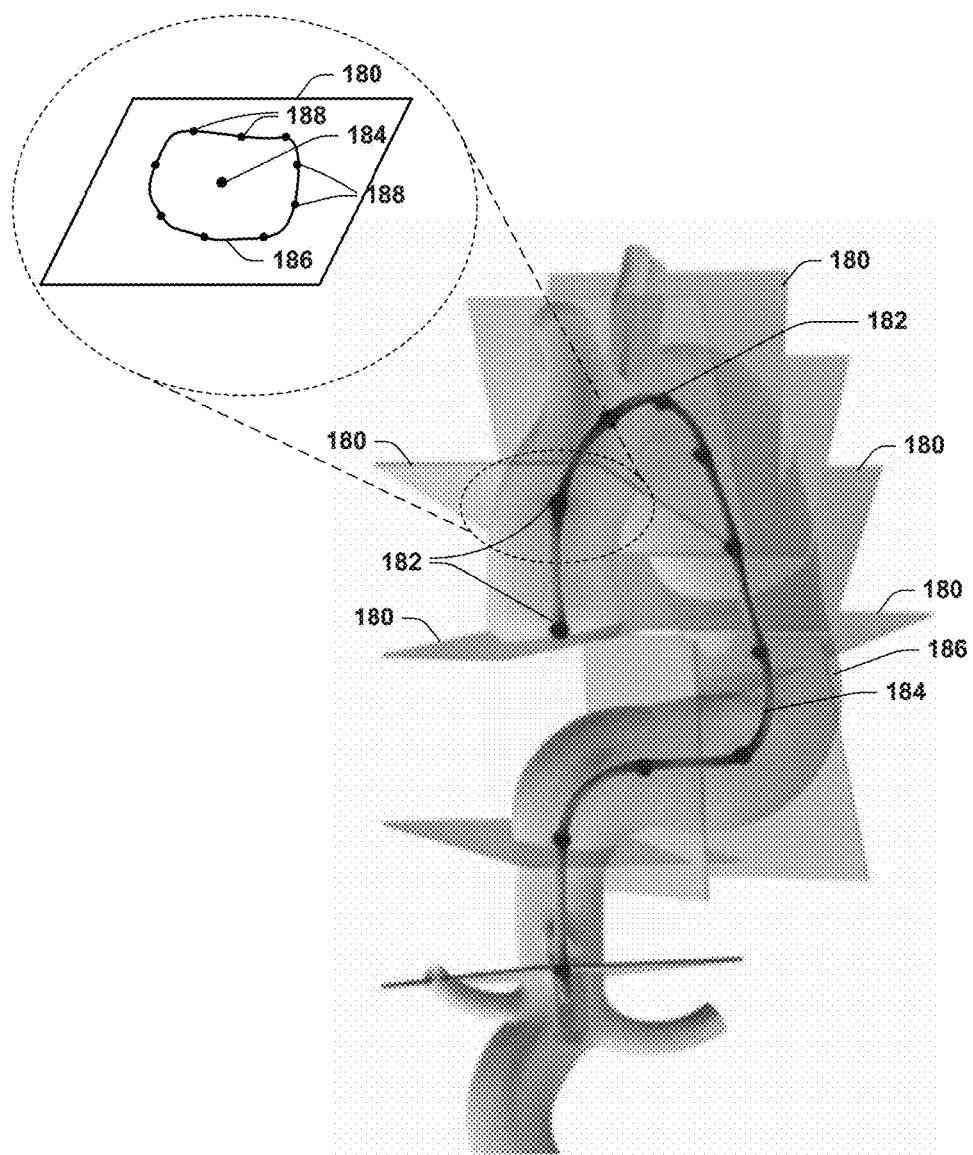
FIG. 13 is a graphical illustration of a centerline and centerline slices that can be employed for surface fitting according to an aspect of the invention.

FIG. 13 depicts a graphical illustration of a plurality of centerline slices 180 extending through selected key points 182 along a centerline 184 of a generally tubular structure 186, such as the aorta. FIG. 13 also depicts an enlarged partial view of a slice 180 taken through the centerline and a set of corresponding geometric knots 188 determined (e.g., by a marching procedure) for the surface of the tubular structure 186.

Figure 14:
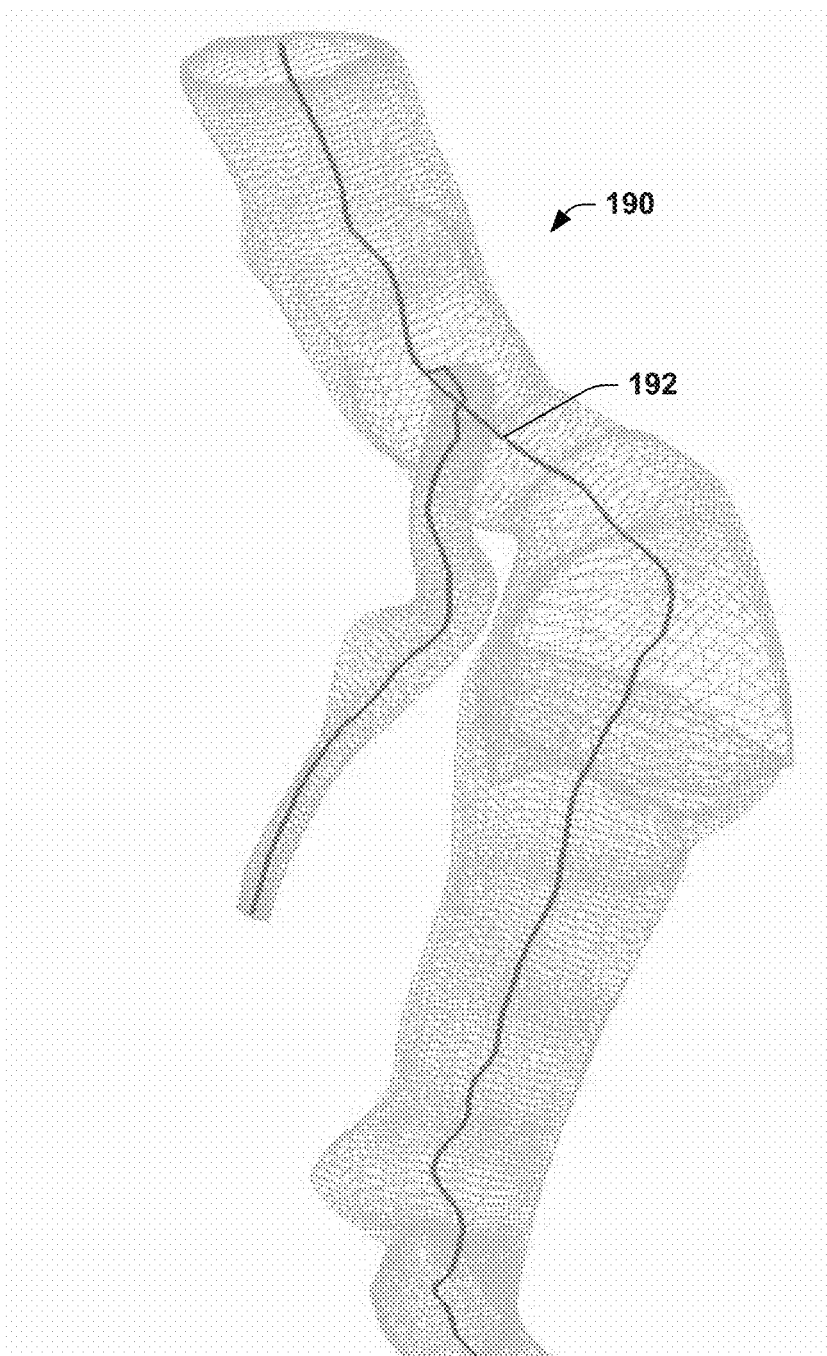
FIG. 14 depicts an example of a three-dimensional surface rendering and centerline for a portion of an arterial lumen according to an aspect of the invention.

The computed slices define a lofted surface. To construct a representation of the entire surface, an interpolation can be performed between these slices, such as by using nonperiodic B-spline functions. The interpolation process can be similar to the process used within each cross-sectional slice. For example, inverse spline algorithm can be employed to derive appropriate control geometry to achieve adequate interpolation. FIG. 14 depicts a graphical representation of an example surface model 190 that can be generated for a multi-branched tubular structure (e.g., a portion of a patient's descending aorta). In FIG. 14, a corresponding centerline 192 for the tubular structure is also shown.

To evaluate the lofted surface, each point on each cross-sectional slice can be treated as a geometric knot on a longitudinal curve. One such longitudinal curve exists for every value of the section curves' parameter u. The longitudinal curve is one dimensional in terms of its parameter v, resulting in a two-dimensional surface indexed by these two parameters.

Figure 15:
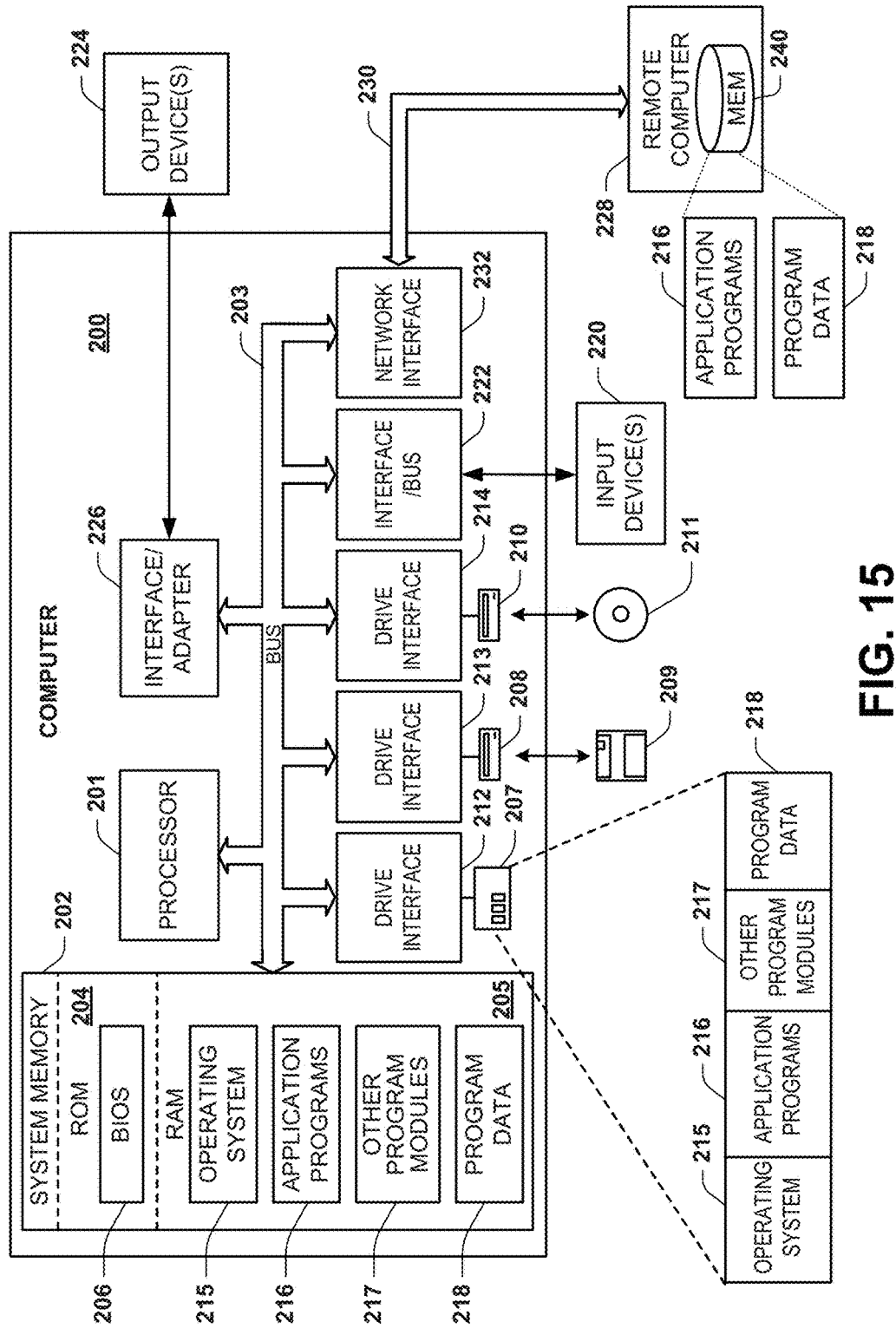
FIG. 15 is an example computer system depicting an example operating environment that can be used for implementing systems and methods according to an aspect of the invention.

FIG. 15 illustrates an example of a computer system 200 that can be employed to execute one or more embodiments of the invention employing computer executable instructions. Computer system 200 can be implemented on one or more general purpose networked computer systems, embedded computer systems, routers, switches, server devices, client devices, various intermediate devices/nodes or stand alone computer systems. Additionally, computer system 200 can be implemented on various mobile clients such as, for example, a cell phone, personal digital assistant (PDA), laptop computer, pager, and the like.

Computer system 200 includes processing unit 201, system memory 202, and system bus 203 that couples various system components, including the system memory, to processing unit 201. Dual microprocessors and other multi-processor architectures also can be used as processing unit 201. System bus 203 may be any of several types of bus structure including a memory bus or memory controller, a peripheral bus, and a local bus using any of a variety of bus architectures. System memory 202 includes read only memory (ROM) 204 and random access memory (RAM) 205. A basic input/output system (BIOS) 206 can reside in ROM 204 containing the basic routines that help to transfer information among elements within computer system 200.

Computer system 200 can include a hard disk drive 207, magnetic disk drive 208, e.g., to read from or write to removable disk 209, and an optical disk drive 210, e.g., for reading CD-ROM disk 211 or to read from or write to other optical media. Hard disk drive 207, magnetic disk drive 208, and optical disk drive 210 are connected to system bus 203 by a hard disk drive interface 212, a magnetic disk drive interface 213, and an optical drive interface 214, respectively. The drives and their associated computer-readable media provide nonvolatile storage of data, data structures, and computer-executable instructions for computer system 200. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of the present invention.

A number of program modules may be stored in drives and RAM 205, including operating system 215, one or more application programs 216, other program modules 217, and program data 218. The application programs and program data can include functions and methods programmed to implement centerline extraction such as described herein. The application programs 216 can also be programmed to compute an analytical expression for the centerline as well as an analytical expression for the surface of the tubular structure. Additional application programs can be employed to evaluate the resulting surface model based on the teachings contained herein.

A user may enter commands and information into computer system 200 through one or more input devices 220, such as a pointing device (e.g., a mouse, touch screen), keyboard, microphone, joystick, game pad, scanner, and the like. These and other input devices 220 are often connected to processing unit 201 through a corresponding port interface 222 that is coupled to the system bus, but may be connected by other interfaces, such as a parallel port, serial port, or universal serial bus (USB). One or more output devices 224 (e.g., display, a monitor, printer, projector, or other type of displaying device) is also connected to system bus 203 via interface 226, such as a video adapter.

Figure 16:
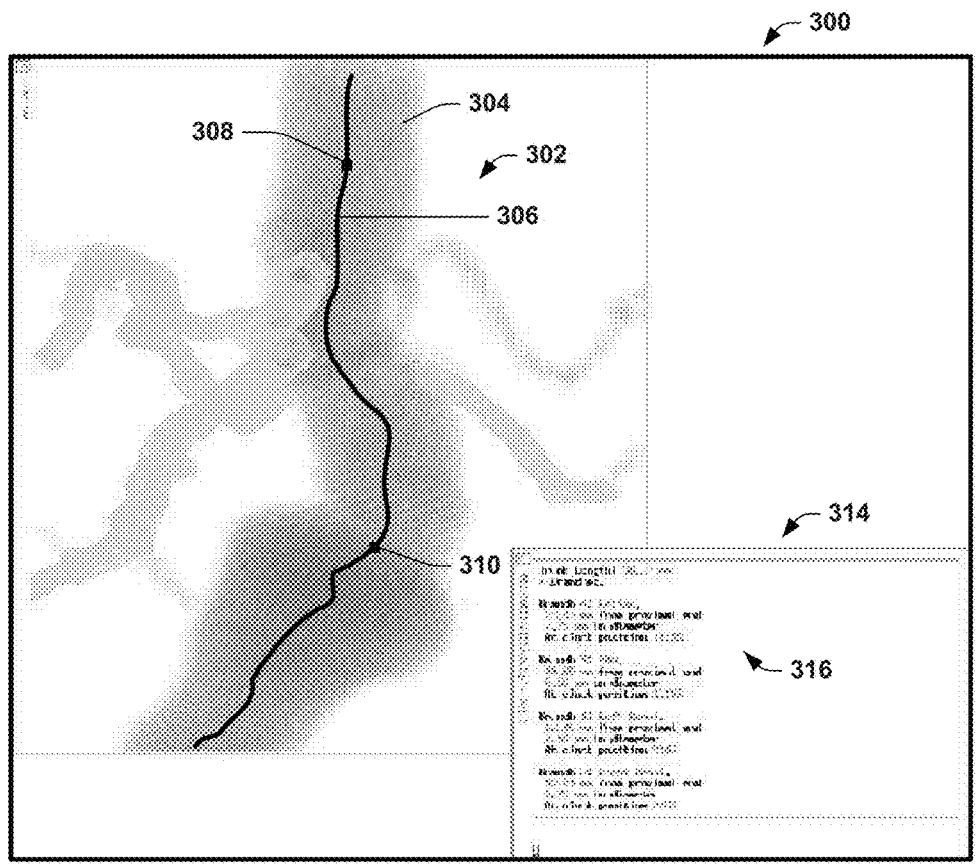
FIG. 16 depicts an example of a graphical user interface that can be utilized to obtain sizing and geometry information for arterial lumen according to an aspect of the invention.

As an example, FIG. 16 shows part of a display 300 that can be utilized to perform analysis of a tubular structure. In FIG. 16, the display 300 includes a graphical representation 302 of a tubular structure. In the example of FIG. 16, the representation 302 includes a surface of an aorta 304 and the centerline 306 of the aorta, such as can be rendered from analytical expressions (or models) generated based on the teachings contained herein. The graphical display 300 can be implemented as part of a graphical user interface that can be employed to facilitate determining geometry and dimensions of a portion of a tubular anatomical structure. For instance, a user can employ the input device 220 (e.g., a mouse or other pointing device) to mark points 308 and 310 along the centerline. Because centerline 306 as well as the shapes of the aorta 304 and associated branch vessels are described as a series of mathematical equations and parameters, the locations and distances needed for sizing can be calculated and provided to the user. For example, a separate dialog box 314 can be rendered on part of the display 300. The dialog box 314 can include a set of parameters 316 that mathematically represent the portion of the lumen between the points 308 and 310. The output parameters can be provided and stored to a file, printer or other media. The parameters can be provided in a form that can be employed by standard engineering tools, such as for further analysis including simulation, generation of a three-dimensional model and/or manufacture of an endovascular stent.

Computer system 200 may operate in a networked environment using logical connections to one or more remote computers, such as remote computer 228. Remote computer 228 may be a workstation, computer system, router, peer device, or other common network node, and typically includes many or all the elements described relative to computer system 200. The logical connections, schematically indicated at 230, can include a local area network (LAN) and a wide area network (WAN).

When used in a LAN networking environment, computer system 200 can be connected to the local network through a network interface or adapter 232. When used in a WAN networking environment, computer system 200 can include a modem, or can be connected to a communications server on the LAN. The modem, which may be internal or external, can be connected to system bus 203 via an appropriate port interface. In a networked environment, application programs 216 or program data 218 depicted relative to computer system 200, or portions thereof, may be stored in a remote memory storage device 240.

Figure 17:
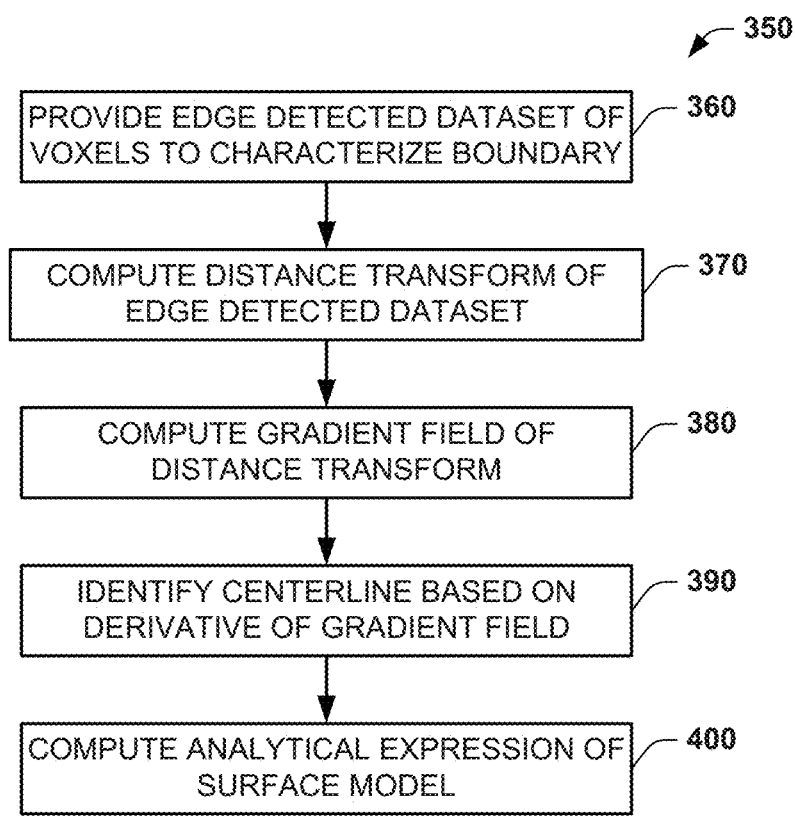
FIG. 17 is a flow diagram illustrating an example method that can be implemented for extracting a centerline and generating a surface model according to an aspect of the invention.

In view of the structural and functional features described above, certain methods will be better appreciated with reference to FIG. 17. It is to be understood and appreciated that the illustrated actions, in other embodiments, may occur in different orders or concurrently with other actions. Moreover, not all features illustrated in FIG. 17 may be required to implement a method. It is to be further understood that the following methodology can be implemented in hardware (e.g., one or more processors, such as in a computer or computer system), software (e.g., stored in a computer readable medium or as executable instructions running on one or more processors), or as a combination of hardware and software.

FIG. 17 depicts an example of a basic method 350 that can be utilized to identify a centerline of a tubular structure according to an aspect of the invention. The method 350 is particularly well suited for identifying a centerline of a tortuous curved path. Examples of such curved paths occur frequently in arterial lumen, the colon, other vascular structures and vessels. The method begins at 360 in which an edge detected data set of voxels is provided to characterize a boundary of a tubular structure. Various methods and approaches can be utilized to process raw image data and to identify boundary of the corresponding tubular structure.

At 370, a distance transform is computed for the edge detected data set. The distance transform computed at 30 essentially converts the Boolean image provided by the edge detected voxel data set into a gray-level image for voxel values identified the distance a given element is from one of the border elements. Those skilled in the art will understand and appreciate various distance transformations (e.g., the Manhattan or Euclidean distance metrics) that can be utilized. At 380, a gradient field of the resulting distance transformation is computed. The gradient field provides a gradient vector field that can be numerically approximated due to the discrete nature of the information in the distance transform gradient data set.

At 390, a centerline is identified based on the derivative of the gradient field. The derivative computation can be performed as a scalar derivative of the vector field using a neighborwise dot product. The computed derivative can be utilized (e.g., via a thresholding procedure) to identify voxels where the gradient of the distance transform changes rapidly, as these voxels define the centerline.

The method 350 can be repeated for each set of image data such as may correspond to images of the tubular structure at different instances of time. For example, the image data set can correspond to a 4-D CT scan in which a plurality of different image sets are required for the tubular structure over a period of time. The method 350 can be repeated for each time slice so that the centerline can be identified for the different configurations or conditions that the tubular structure may exist in over the period of time in which the images are acquired.

At 400, a surface model is computed based on the identified centerline. As described herein, the surface model can be determined by first computing an analytical expression for the identified centerline and then computing the surface model based on the centerline and a segmented data set for the tubular structure. Those skilled in the art will understand and appreciate various approaches that can be employed to compute a corresponding surface model.

The particular mathematical model used to describe the geometry provides its own advantages. The list of equations and parameters which fully describes the shape of the arterial lumen is both compact and appropriate for the purpose of describing a bifurcating lumen. Rather than consisting of a huge grid of numbers occupying hundreds of megabytes, as a DICOM image does, it consists of a small set of numbers occupying mere kilobytes. Further, the structure of the numbers actually contains meaningful information about the underlying geometry. The potential utility of such a representation is great when one considers the ease with which it can be transmitted, shared, and stored.

The precision, accuracy, comprehensibility, and conciseness of this model make available a multitude of directions for future work. In addition to surgery planning, this geometric analysis can be used for diagnostic purposes. For example, because it inherently quantifies the diameter of the lumen, it is well-suited for identifying aneurysmal or stenosed vessels. Additionally, an implantable device, such as a stent or other structure, can be dimensioned and configured as a function of a mathematical model produced according to methods described herein. The mathematical model also can be utilized intraoperatively, such as by providing a visual representation that can be superimposed or fused with real time imaging data. As a further example, the shape of a catheter can be computed as a function of the analytical model. Thus, manual or automatic means can be employed to configure a catheter or other delivery device to facilitate travel through a lumen. For instance, a robotic system can change the shape of a distal end portion of a steerable catheter as a function of the model, as well as advance the distal end of the catheter intra-lumenally along a desired path, which path can also be determined as a function of the model.

The advent of 4-D CT scans presents a great opportunity for thorough geometric analysis. The ability to visualize the movement of anatomy as the cardiac cycle progresses allows for immensely greater understanding of tissue than is possible with only 3-D scans. For example, there is evidence that the material properties of the aortic wall can predict the likelihood of a dissection in patients predisposed to such an event. A high-resolution 4-D CT scan combined with a thorough geometric analysis can yield more precise quantification of geometric change than is possible with lower-resolution or lower-dimensional imaging techniques.

Figure 18:
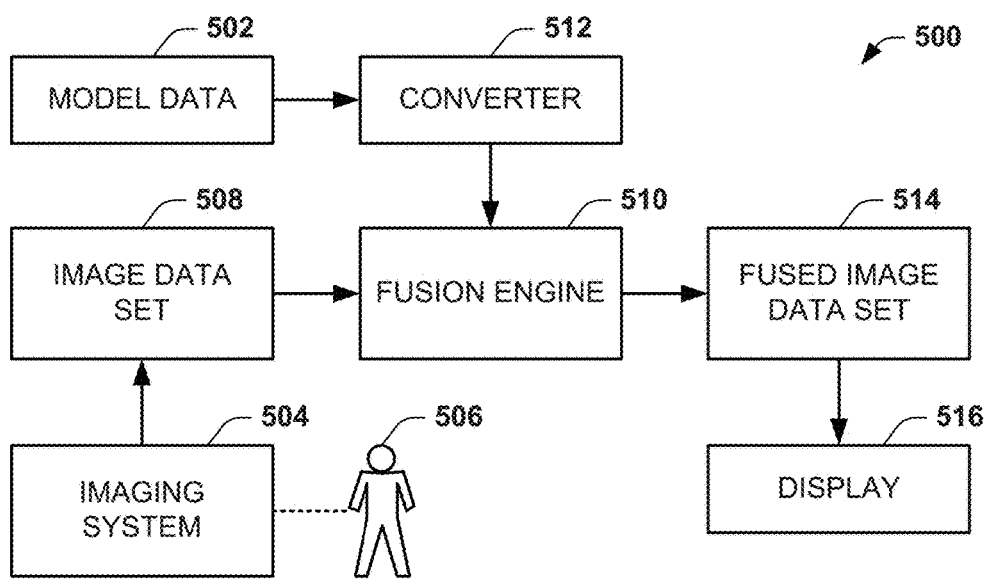
FIG. 18 depicts an example of a system that can be utilized to fuse a model into another image cording to an aspect of the invention.

FIG. 18 depicts an example of a fusion system 500 that can combine a graphical representation of a model with other image data to provide a fused image. The system 500 can import or otherwise be provided model data 502, such as data corresponding to a mathematical model generated according to an aspect of the invention. For example, the model data 502 can include a surface model of a length of a patient's vasculature or other anatomic structure. The model can be generated from a prior 3D image acquired for a given patient. As described herein, the model can be generated based on data acquired from a variety of one or more imaging modalities. The model data 502 can correspond to a single static 3D model. Alternatively, the model data 502 can be constructed as a 4D model from a plurality of images. Such a 4D model can include a separate model data set for each of plurality of phases of an image acquisition process. The phases, for instance, can be a set of images gated to physiological condition of the patient, such as can include gating to the patient's cardiac cycle (e.g., ECG gating), the patient's respiration or may include both cardiac and respiratory gating. In this way, 4D model data 502 can represent deformation of the modeled anatomical structure over a period of time. Additionally, as described herein, one or more anatomical markers or landmarks can be included in or be associated with the model data to facilitate registration of the model with other image data as described herein.

Figure 19:
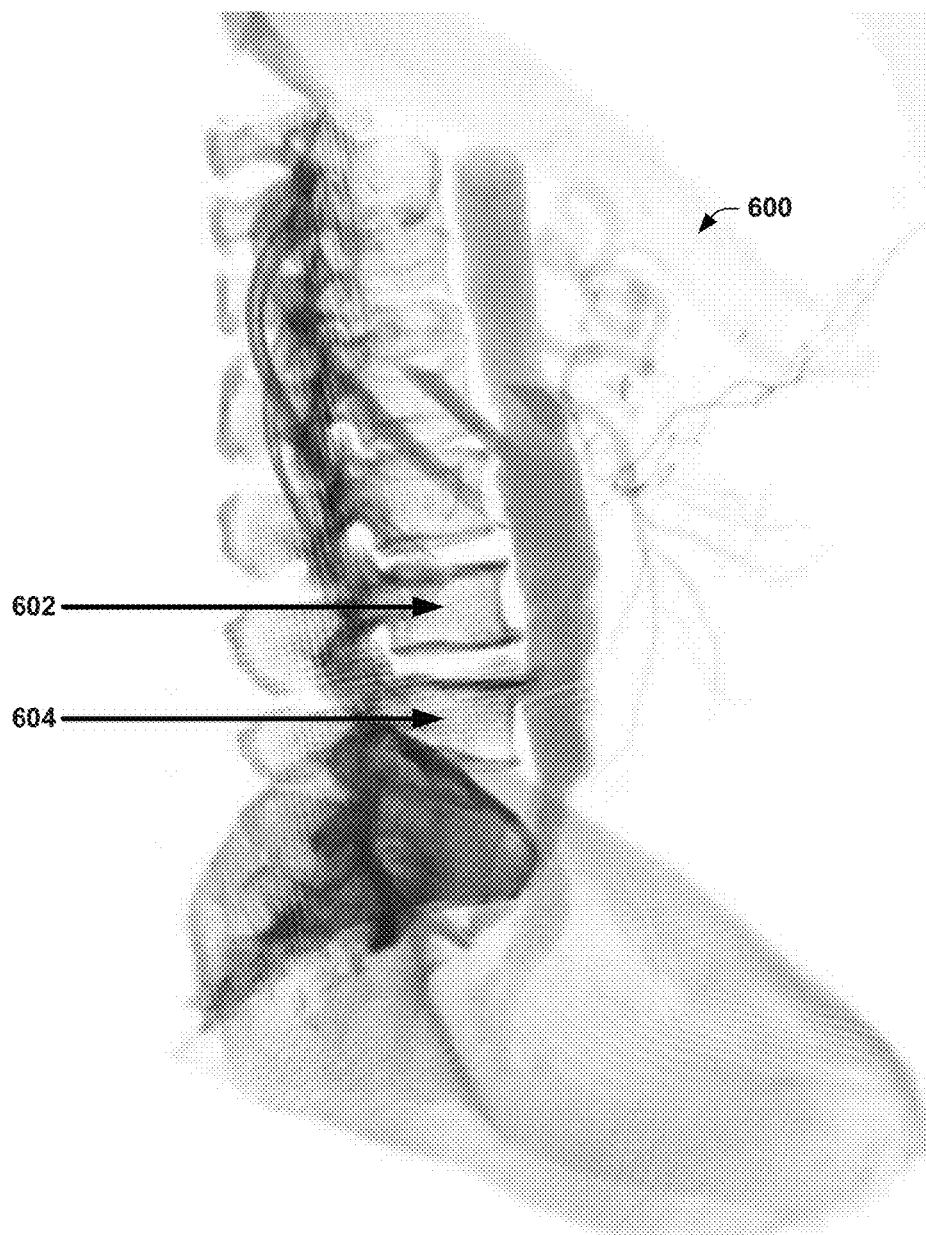
FIG. 19 depicts an example of an image of a patient's anatomy demonstrating anatomical landmarks.
Figure 20:
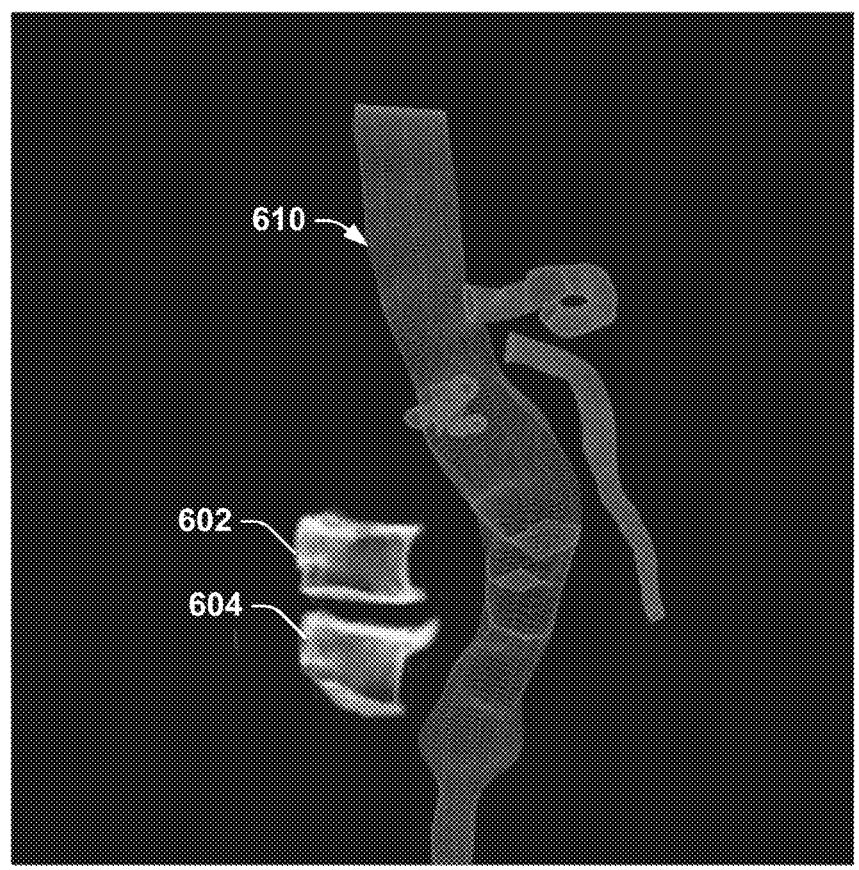
FIG. 20 depicts an example of an image demonstrating anatomical landmarks associated with a representation of a surface model according to an aspect of the invention.

FIG. 19 depicts an example of an image 600 that includes anatomical landmarks 602 and 604 that can be associated with an analytical model to facilitate registration of the model, as described herein. FIG. 20 is another image illustrating a wire frame representation for a surface model 610 of a portion of a descending aorta, such as can be generated according to an aspect of the invention. Also shown in FIG. 20 are the anatomical landmarks 602 and 604 such as can be acquired and associated with the model. As described herein, the landmarks 612 can be utilized to facilitate registration of a graphical representation of the model into another image set of the patient's anatomy.

The system 500 includes an imaging system 504 that is configured to acquire images of the anatomy of a patient 506 according to one or more imaging modality. By way of example, the imaging system 504 may be implemented as a CT device (e.g., a cardiac CT system), a fluoroscopic imaging system, a magnetic resonance imaging (MRI) device, a positron emission tomography (PET) device or a combination of two or more modalities (e.g., PET/CT system). In one embodiment, the imaging system 504 can be implemented as an intraoperative imaging system that includes a C-arm on which an X-ray source and a radiation detector are mounted. In such an imaging device, the field of examination of the patient 506 is located in an isocenter of the C-arm for generating images of the patient's anatomical features within the isocenter.

The imaging system 504 generates an image data set 508. The image data set 508 can represent one or more two-dimensional images of the patient's 506 anatomy or one or more 3D images of the patient's anatomy. For instance, two-dimensional images can be processed to generate a corresponding 3D image. Alternatively, a series of 3D images can be acquired for the patient to provide a corresponding 4D image data set. For instance, the 4D image data set can include a plurality of phases acquired over a period of time, such by cardiac gating and/or respiratory gating the image acquisition process for the patient 506. It is to be understood that the particular type of gating utilized to acquire the image data set 508 can be the same as or be consistent with the gating utilized in the image acquisition process for obtaining the image data from which the model data 502 has been generated. In this way, for 4D scenario, the phases of the model data 502 can align with respective phases of the image data set 508 acquired by the imaging system 504.

FIG. 20 depicts one example of an image 620 that can be acquired by fluoroscopy for a given patient into which the model is to be fused. The image 620 includes anatomy of interest (e.g., the aorta) as well as surrounding anatomical features, including the anatomical landmarks that have been associated with the model.

Referring back to FIG. 18, the system 500 also includes an image fusion engine 510 that is programmed to merge the model represented by the model data 502 into an image represented by the image data to provide a corresponding fused image data set 514. However, as described herein, the model data 502 is a mathematical model, such as a surface model that mathematically defines a surface of an anatomical structure of the patient 506. Thus, the system 500 can include a converter 512 that is programmed (if necessary) to convert the model data 502 into a format that is compatible with the image data set 508. As one example, the image data set 508 can be stored according to the DICOM (Digital Imaging and Communications in Medicine) standard, which has been developed and sponsored by the American College of Radiology and the National Electrical Manufacturers Association. The converter 512 thus can link or otherwise associate the model (defined by the model data 502) or a numerical representation of the model with the image data set 508. While in the example of FIG. 18, the converter is depicted as part of the system 500, it will be appreciated that the converter can be implemented separately, such as by converting the model to an appropriate format concurrently with the model being generated. The converter 512 further may be programmed to convert the model data 502 to any number of one or more formats to enable substantially seamless integration of the model and the image being acquired.

The image fusion engine 510 generates the fused image data set 514 that includes a graphical representation of the model superimposed on a graphical representation of the image defined by the image data set 508. The image fusion engine 510 can perform appropriate scaling and registration of the model into the image by utilizing the anatomical markers or landmarks identified for each of the model data 502 and the image data set 508. Those skilled in the art will appreciate an appropriate set of one or more image features that can be selected as markers or landmarks for registering the model into the newly acquired image. Such features, for example, can include anatomical structures, boundaries of structures and the like. Additionally, for the 4D example, it will be appreciated that each phase of the model and the image can be aligned matched by employing anatomical markers provided for each such phase, which may be the same or different for each respective phase. The resulting fused image data set further may be provided to a display 516, which can provide intraoperative guidance.

Figure 21:
FIG. 21 depicts an example of an image acquired for a patient, such as during an intraoperative procedure.
Figure 22:
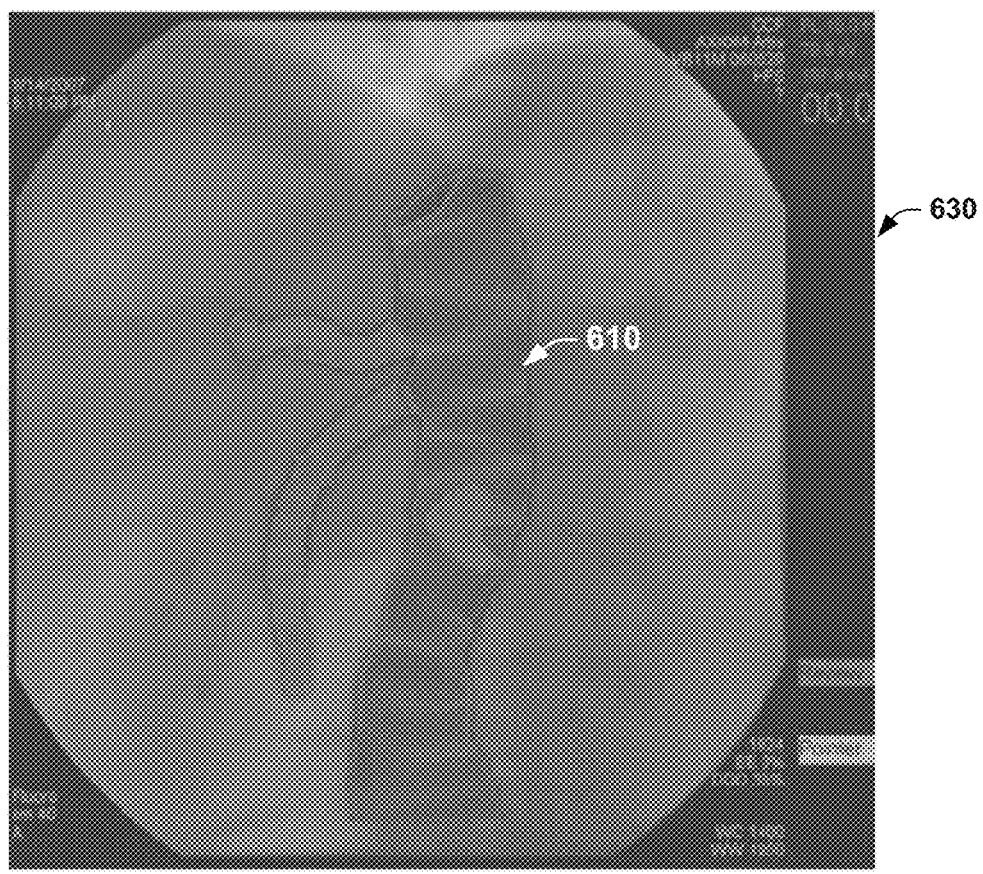
FIG. 22 depicts an example of a fused image demonstrating a representation of a surface model superimposed on the acquired image of FIG. 21 according to an aspect of the invention.

FIG. 22 depicts an example of a fused image 630 in which the wire frame representation of the surface model 610 (FIG. 20) has been registered into the image 620 (FIG. 21) acquired for the patient. The registration of the model 610 and the image of the patient anatomy is facilitated based on the common identifiable anatomical landmarks 612 (FIG. 20) in the respective images. While the fusion process has been described as an automated process running on a computer, it will be appreciated that the registration may also be performed manually according to an aspect of the invention.

Figure 23:
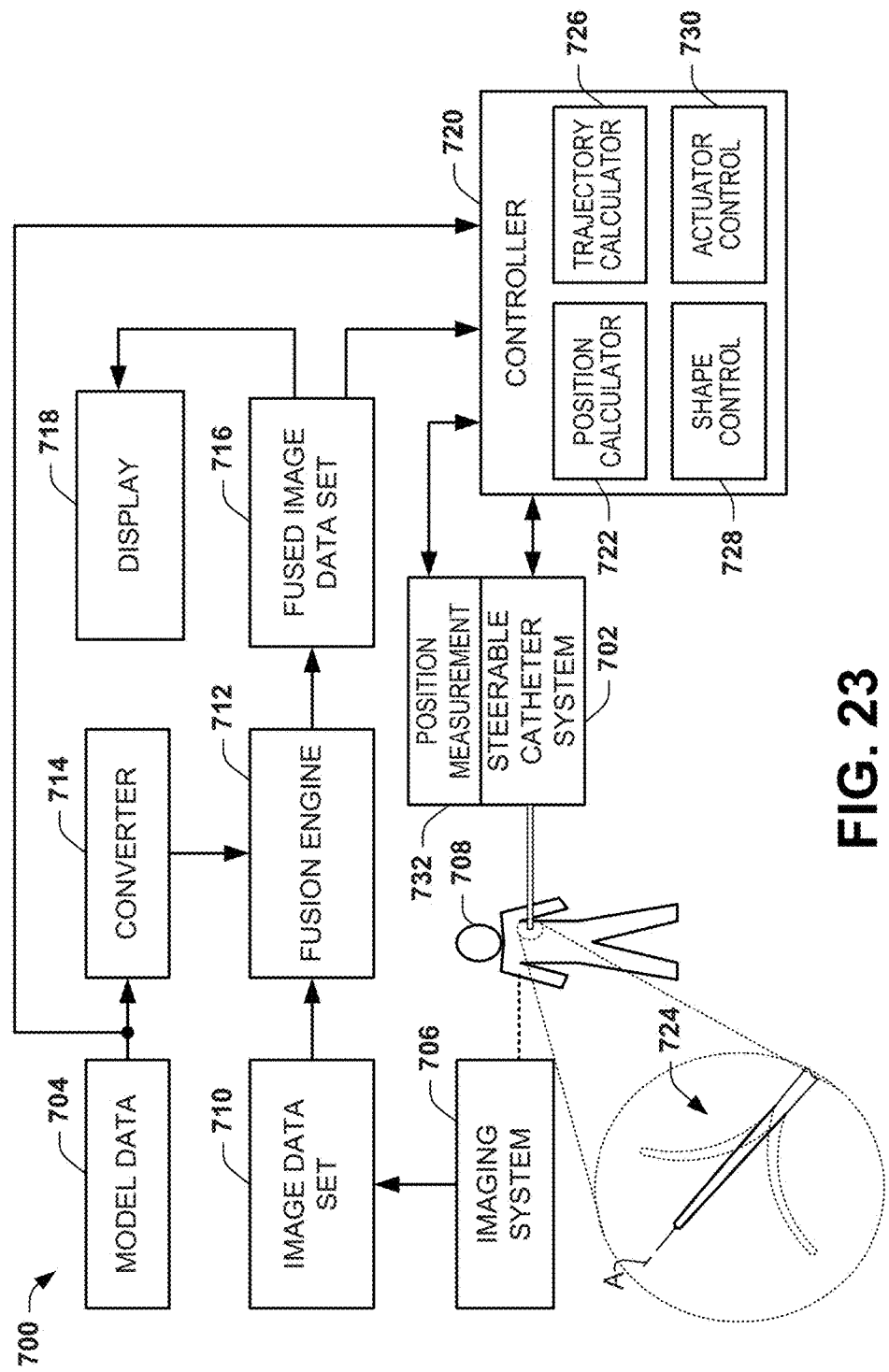
FIG. 23 depicts example of a system that can be utilized to control a steerable medical device according to an aspect of the invention.

FIG. 23 depicts an example of a system 700 that is programmed and configured to control a steerable catheter system 702 based on an analytical expression of a model determined according to an aspect of the invention. The system 700 can include many of the same types of components as the fusion system 500 of FIG. 18. Accordingly, additional information regarding these common features and components can be obtained with reference back to the description of FIG. 18.

Briefly stated, the system 700 can import or otherwise be provided model data 704, such as data corresponding to a mathematical model according to an aspect of the invention. For example, the model data 502 can include a surface model of a length of a patient's vasculature or other anatomic structure. Additionally or alternatively, the model data can parameterize a centerline for the patient's vasculature or other anatomic structure of interest. The model data 704 can correspond to a single static 3D model or a 4D model from a plurality of images. Additionally, as described herein, one or more anatomical markers or landmarks can be included in or be associated with the model data to facilitate registration of the model with other image data as described herein.

The system 500 includes an imaging system 706 that is configured to acquire images of the anatomy of a patient 708 according to one or more imaging modality, such as including any modality described herein. The imaging system 706 generates an image data set 710, which can correspond to a 2-D or 3-D or 4-D visualization of the patient's anatomy, including at least a portion of the anatomy for which the model has been generated. Typically the model data 704 will be constructed a priori, although as processor speeds continue to increase, it is contemplated that the model data can be generated in a run time operation based on the image data set 710 (e.g., which can be acquired intraoperatively).

The system 700 also includes a fusion engine 712 that is programmed to merge the model represented by the model data 704 with an image represented by the image data 710 to provide a corresponding fused image data set 716. As described herein, the model data 704 corresponds to a mathematical model, such as a surface model that mathematically defines a surface of an anatomical structure of the patient 708 and/or a centerline model that defines a centerline of the anatomical structure. Thus, the system 700 may include a converter 714 that is programmed to convert the model data 704 into a format that is compatible with the image data set 710. The image fusion engine 712 generates the fused image data set 716 that includes a graphical representation of the model superimposed on a graphical representation of the image defined by the image data set 710. The resulting fused image data set further may be provided to a display 718, which can provide intraoperative guidance.

The system 700 also includes a controller 720 that is programmed to control the steerable catheter system 702. The control that is provided by the system can vary according to the type of procedure and equipment available. For instance, the controller can provide for manual control (e.g., based on the display of a graphical representation of a fused image). Additionally or alternatively, the controller 720 can provide for robotically assisted manual control (e.g., some amount of manual control of the steerable catheter is required) or it can provide for fully automatic robotic control. The controller 720 can be implemented as a computer that includes memory programmed with instructions, which when executed by one or more processors perform one or more methods for controlling the catheter system 702.

For example, the controller 720 can implement one or more methods (depicted as including a position calculator 722, a trajectory calculator 726, shape control 728 and actuator control 730) that employs an iterative process to direct distal tip to the desired position, responsive to position information (e.g., generated by a position measurement system 732 and/or by the fused image data set 716) at each iteration. By continuously checking the location of distal tip and appropriately driving the control mechanisms to adjust the shape and position of the distal end portion of the catheter 724, the distal end portion can be controlled to a substantially precise location and configuration, regardless of the particular structure of catheter or characteristics of the tissue surrounding catheter at any given time.

The position calculator 722 is programmed to compute the position of a catheter, indicated schematically at 724, within the patient 708. The position calculator 722 can also determine a configuration of the distal end portion of the catheter 724. The configuration information can be determined based on the image of the catheter and/or based on control information provided associated controls or feedback from the catheter system 702. The position calculator 722 can compute the position and configuration of the catheter 724 based on one or both of the image data set 710 and the fused image data set 716. Additionally or alternatively, the system 700 can include a position measurement system 732 that is configured to provide an indication of position for the catheter within the patient's body 708. Examples of the position measurement system include placing a sensor at the distal end of the electrode with an electromagnetic measurement system placed near the body to determine the position of the catheter in the patient 708. Those skilled in the art will understand and appreciate other types of position measurement systems that can be utilized to provide an indication of position and configuration of the distal end portion of the catheter 724.

The trajectory calculator 726 is programmed to determine a desired trajectory for advancing the catheter 724 in the patient. For example, a desired trajectory can be determined as corresponding to a path defined by a centerline that is represented by the model data 704. The controller 720 also includes shape control 728 and actuator control 730 that collectively are programmed to control the shape and position of the catheter 724. For instance, the shape control 728 can be programmed to send control signals to the steerable catheter to cause the configuration of the distal end portion to match a particular configuration, such as determined by the trajectory calculator 726. The particular manner of control and the types of shapes (e.g., radius of curvature) will generally vary according to the type of steerable catheter 724. Thus, the shape control 728 can be programmed to achieve deflection of the distal end portion of the catheter 724 relative to its longitudinal axis 'A'.

The trajectory determined by the trajectory calculator 726 can include one of a main trunk and any number of one or more branches of a tubular structure, such as including the aorta or other generally tubular anatomical structures. The centerline represented by the model data 704 can be utilized by the trajectory calculator to provide one possible trajectory. The particular trajectory can vary according to the destination site of the catheter, which information can be entered into the controller via a user interface (not shown). While the shape and actuator control functions 728 and 730 are depicted as separate methods of the controller 720, it will be understood that single control method can be employed as means for changing the configuration and for adjusting the position distal end portion of the catheter 724.

As described herein, the centerline for a multi-branched structure can be truncated at the branches, such that a continuous trajectory may not exist in the model data 704 for a trajectory that includes multiple branches. Accordingly, the trajectory calculator 726 can be programmed to compute a curved path as a function of two adjacent centerlines as represented by the model data 704, such as a function of the centerline computed for a main trunk and the centerline computed for a corresponding branch. The trajectory calculator 726 can compute the resulting trajectory as including gradual curved path that interconnects the two centerlines. To determine such a curved path, the trajectory calculator 726 can identify end points on the centerlines that are spaced axially apart from the location where the centerline truncates (e.g., by moving along each centerline away from the adjacent branch centerline). This enables the trajectory calculator to determine a more gradual curve that can be more easily imparted to the catheter by the shape control 728.

The shape control 728 thus can be programmed to cause the distal end portion of the catheter 724 to have a configuration that substantially matches the computed trajectory that includes multiple centerlines and the curved path that interconnects the centerlines. The shape control 728 can further vary configuration can further vary depending the position of the distal end of the catheter (determined by the position calculator) which position will vary according to axial movement of the catheter effected by the actuator control 730. Thus, as the actuator control causes the distal end of the catheter to advance axially along a determined trajectory, the model data 704 provides substantial real time feedback that can be utilized by the shape control 728 to adjust the shape of the distal end portion of the catheter 724. It will be appreciated that manual override can be implemented to further adjust the shape of the catheter and or to adjust the axial position of the distal end portion.

While the example of FIG. 23 is described with respect to a steerable catheter system 702, it will be understood that the system 700 is applicable to virtually any types of steerable, flexible medical devices, such as guide wires, introducer sheaths, guiding catheters, or any similar medical device. Those skilled in the art will understand and appreciate various types and configurations of steerable catheters and other flexible and steerable medical devices that can be utilized in the catheter system 702.

As one example, the catheter system can include a plurality of puller wires disposed about the circumference of the catheter at a plurality of axial positions and extend along its length, typically passing through respective lumens. The distal ends of the puller wires can be attached at respective points proximal to a distal end of the catheter (e.g., at axially and circumferentially spaced apart locations), and the proximal ends of the wires are coupled to respective motors or other actuators. The motors are able to tense and relax the respective puller wires to manipulate (e.g., cause deflection of) the distal end of the catheter to a desired configuration. Alternatively, catheter system 702 can employ different types of steering mechanisms, including, for example, a steering mechanism that utilizes shape memory alloys (SMAs), electroactive polymers (EAPs), and/or ionic polymer metal composites (IPMCs). Some examples of existing steerable medical devices that can be implemented, in whole or in part, as the catheter system 702, are disclosed in U.S. Pat. Nos. 6,997,870 and 7,077,823, U.S. Patent Publication Nos. 2007/0197896 and 2007/0100235 and International Patent Publication No. WO 2006/119,495.

For instance, U.S. Pat. No. 6,997,870 discloses a type of guide catheter is provided in which electroactive polymer actuators are integrated into the guide catheter structure. A control unit is coupled to actuators and sends control signals to the actuators. Based upon the control signals received from the control unit, the actuators change the shape of a guide catheter portion.

U.S. Patent Publication No. 2007/0197896 discloses using a robotically controlled guide instrument coupled to an instrument drive assembly. A user interface of a master controller is utilized to actuate the drive assembly and thereby position a distal portion of the guide instrument at a site in a patient's body. The location of the guide instrument may be determined from real-time image data of the patient's body or from localization data obtaining from one or more sensors carried on the guide instrument.

U.S. Patent Publication No. 2007/0100235 discloses steerable catheter devices and methods of using articulating catheter devices. The steerable catheter imparts bending at a distal end of an elongated catheter by providing a change in internal fluid pressure.

U.S. Pat. No. 7,077,823 discloses a steerable catheter that has two puller wires, which are respectively coupled to two movable elements in a control handle, whereby displacement of movable element coupled to first puller wire causes deflection of catheter tip.

Each of these above-described patents and patent publications (U.S. Pat. Nos. 6,997,870 and 7,077,823, U.S. Patent Publication Nos. 2007/0197896 and 2007/0100235 and International Patent Publication No. WO 2006/119,495) is incorporated herein by reference. Based on the teachings contained in this document and any document indicated as being incorporated by reference, one skilled in the art will understand how the examples in the above-incorporated patents and patent publications may be modified to utilize the model data to control positioning a catheter.

Figure 24:
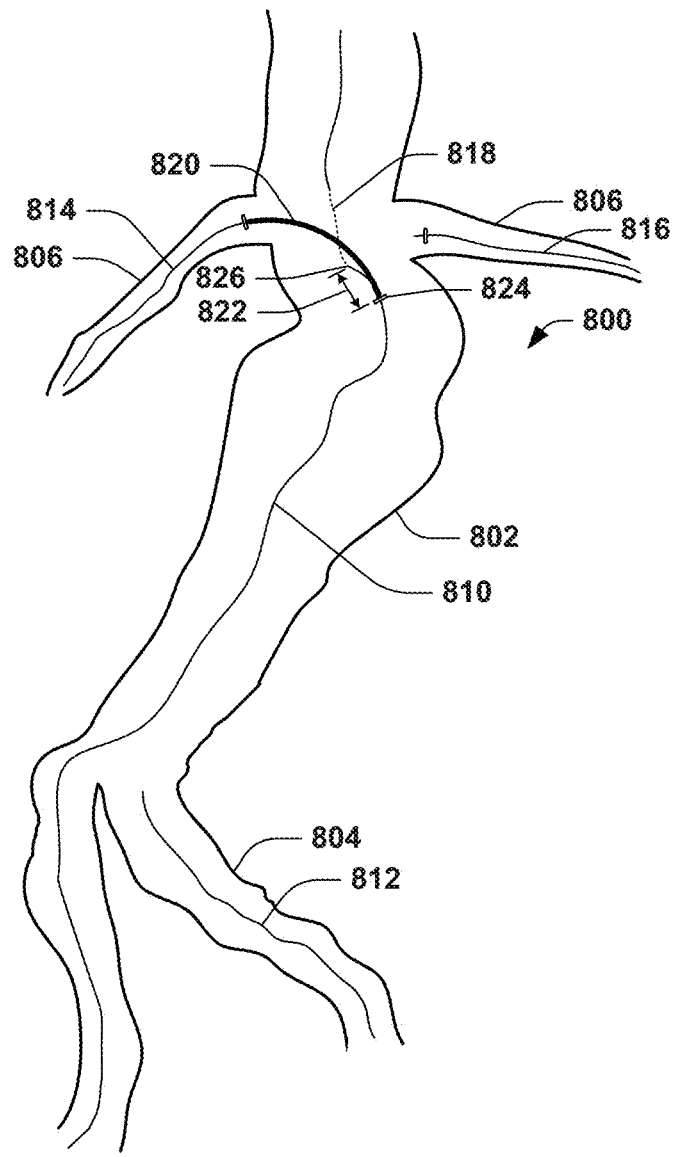
FIG. 24 depicts an example of an analytical centerline and surface for a tubular anatomical structure demonstrating a trajectory between centerlines of adjacent branches that can be determined according to an aspect of the invention.

FIG. 24 depicts an example of a graphical depiction of a tubular structure 800 for demonstrating how a trajectory can be computed, such as by the trajectory calculator 726 in the system 700 of FIG. 23. In the example of FIG. 24, the tubular structure 800 includes a main branch 802 and a plurality of branches 804, 806 and 808. The main branch 802 includes a centerline 810 that has been computed and defined by a model according to an aspect of the invention. Each of the branches 804, 806 and 808 also includes a respective centerline 812, 814 and 816 computed in a similar manner as described herein. Thus, each of the branch centerlines 812, 814 and 816 is truncated from the main branch centerline 810. The main branch centerline can also be truncated at the region where the branches 806 and 810 extend or, alternatively, the main branch centerline can be interpolated at such region, as indicated at dotted line 818.

By way of example, a curved trajectory 820 can be computed as extend from the main branch 802 into the lateral branch 806 as a function of the centerlines 810 and 814. To improve the gradual nature of the curved path trajectory 820 interconnecting the centerlines 810 and 814, the path can walk backward along the centerline 810 a distance, indicated at 822, to define a starting point 824 for the computed trajectory on the centerline 810 that is spaced axially apart from the point 826 where the centerline 810 ends. It will be understood that trajectories can be computed similarly to interconnect the centerlines for any two adjacent branches in the structure 800. Since the centerlines 810 and 814 are mathematical models, the resulting interconnecting What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this description, including the appended claims.

What is claimed is:

1. A non-transitory computer-readable medium including instructions executable by one or more processors to perform a method, the method comprising:
generating a centerline model to parameterize a centerline of a tubular structure of a patient's anatomy, wherein generating the centerline model comprises:
computing a gradient vector field based on a three-dimensional voxel data set that includes voxels in image data for the tubular structure;
computing a scalar derivative of the voxels in the gradient vector field; and
identifying a contiguous set of voxels residing on the centerline of the tubular structure based on an evaluation of the computed scalar derivative, the centerline model being generated based on the set of voxels;
computing a respective surface model of the tubular structure at each of a plurality of different time instances based on a respective centerline model that parameterizes the centerline of the tubular structure for each of the plurality of different time instances;
generating four-dimensional model data characterizing the respective surface model of the tubular structure at each of the different time instances to represent deformation of the tubular structure over a period of time; and
displaying a graphical representation of the tubular structure based on the four-dimensional model data.

2. The medium of claim 1, further comprising acquiring an image data set for the patient's anatomy via an imaging system, the image data set including at least a portion of the tubular structure.

3. The medium of claim 1, wherein the four-dimensional model data is gated to a cyclical physiological condition of the patient.

4. The medium of claim 1, wherein the method further comprises:
generating a fused image data set that comprises the surface model superimposed on the graphical representation of the tubular structure; and
providing the fused image data set to a display to provide intraoperative guidance.

5. The medium of claim 4, wherein the method further comprises:
selecting at least one image feature as a landmark; and
registering the surface model with the graphical representation based on the at least one image feature.

6. The medium of claim 4, wherein the method further comprises computing a position of a catheter inside the tubular structure based on the fused image data set.

7. The medium of claim 1, wherein the method further comprises computing a trajectory through the tubular structure based on the centerline model.

8. The medium of claim 7, wherein the method further comprises controlling a steerable flexible medical device to traverse the tubular structure according to the computed trajectory.

9. The medium of claim 8, wherein the trajectory varies according to a destination site that is entered via a user interface.

10. A system, comprising:
memory to store instructions and data; and
at least one processor to access the memory and execute instructions, the instructions comprising a model generator programmed to generate a centerline model that parameterizes a continuous centerline of a tubular structure in a three-dimensional coordinate system, wherein the model generator is programmed to:
compute a gradient vector field based on a three-dimensional voxel data set that includes voxels in image data for the tubular structure;
compute a scalar derivative of the voxels in the gradient vector field; and
identify a contiguous set of voxels residing on a centerline of the tubular structure based on an evaluation of the computed scalar derivative, the centerline model being generated based on the set of voxels;
compute a respective surface model of the tubular structure at each of a plurality of different time instances based on a respective centerline model that parameterizes the centerline of the tubular structure for each of the plurality of different time instances;
generate four-dimensional model data characterizing the respective surface model of the tubular structure at each of the different time instances to represent deformation of the tubular structure over a period of time;
a display for displaying a graphical representation of the tubular structure generated based on the four-dimensional model data.

11. The system of claim 10, further comprising a fusion engine programmed to generate a fused image data set that comprises the surface model superimposed on the graphical representation of the tubular structure,
wherein the fusion engine is programmed to register the surface model with the graphical representation based on at least one image feature.

12. The system of claim 11, further comprising a position calculator programmed to determine a position of a distal end of a steerable flexible medical device within the tubular structure based on the fused image data set.

13. The system of claim 10, further comprising a trajectory calculator programmed to compute a trajectory through the tubular structure based on the centerline model.

14. The system of claim 13, further comprising a user interface to select a target site, the trajectory calculator programmed to compute the trajectory according to the selected target site.

15. A system, comprising:
an imaging system programmed to acquire an image data set for a portion of a patient's anatomy corresponding to a tubular structure; and
a model generator programmed to generate a centerline model that parameterizes a centerline of a tubular structure, wherein the model generator is programmed to:
compute a gradient vector field based on a three-dimensional voxel data set that includes voxels in image data for the tubular structure;
compute a scalar derivative of the voxels in the gradient vector field;
identify a contiguous set of voxels residing on the centerline of the tubular structure based on an evaluation of the computed scalar derivative, the model generator generating the centerline model from the contiguous set of voxels;
compute a respective surface model of the tubular structure at each of a plurality of different time instances based on a respective centerline model that parameterizes the centerline of the tubular structure for each of the plurality of different time instances; and
generate four-dimensional model data characterizing the respective surface model of the tubular structure at each of the different time instances to represent deformation of the tubular structure over a period of time.

16. The system of claim 15, further comprising:
a fusion engine programmed to generate a fused image data set that comprises the surface model superimposed on a graphical representation of a portion of the patient's anatomy corresponding to the tubular structure;
a trajectory calculator programmed to compute a trajectory through the tubular structure based on the centerline model.

* * * * *